United States Patent
Stamatakis et al.

(10) Patent No.: US 10,193,751 B1
(45) Date of Patent: Jan. 29, 2019

(54) SYSTEM, METHOD AND APPARATUS FOR CONFIGURING A NODE IN A SENSOR NETWORK

(71) Applicant: Senseware, Inc., McLean, VA (US)

(72) Inventors: Julien G. Stamatakis, Centreville, VA (US); Thomas Hoffmann, Fairfax, VA (US)

(73) Assignee: Senseware, Inc., Vienna, VA (US)

( * ) Notice: Subject to any disclaimer, the term of this patent is extended or adjusted under 35 U.S.C. 154(b) by 83 days.

(21) Appl. No.: 14/996,442

(22) Filed: Jan. 15, 2016

Related U.S. Application Data

(63) Continuation-in-part of application No. 14/862,280, filed on Sep. 23, 2015, now Pat. No. 9,800,646, which is a continuation-in-part of application No. 14/710,766, filed on May 13, 2015, now Pat. No. 9,534,929, and a continuation-in-part of application No. 14/710,711, filed on May 13, 2015, now Pat. No. 9,538,578, and a continuation-in-part of application No. 14/710,652, filed on May 13, 2015, and a continuation-in-part of application No. 14/710,191, filed on May 12, 2015, now Pat. No. 9,534,930, and a continuation-in-part of application No. 14/710,170, filed on May 12, 2015, now Pat. No. 9,551,594, and a continuation-in-part of application No. 14/710,247, filed on May 12, 2015, now Pat. No. 9,813,489, and a continuation-in-part of application No. 14/710,209, filed on May 12, 2015, now Pat. No. 9,756,511.

(60) Provisional application No. 62/136,959, filed on Mar. 23, 2015, provisional application No. 61/992,307, filed on May 13, 2014.

(51) Int. Cl.
*H04L 12/58* (2006.01)
*H04L 12/24* (2006.01)
*H04L 29/08* (2006.01)
*G06F 17/30* (2006.01)
*H04W 88/16* (2009.01)

(52) U.S. Cl.
CPC ...... *H04L 41/0813* (2013.01); *G06F 17/3033* (2013.01); *H04L 67/125* (2013.01); *H04W 88/16* (2013.01)

(58) Field of Classification Search
CPC ........ G01D 4/002; G01D 4/006; G01D 4/004; H04W 84/18; H04W 4/005; H04W 4/008; G06F 3/0482; G06F 3/04842; G08C 19/00; G08B 19/00
USPC ......................................... 370/252, 395, 329
See application file for complete search history.

(56) References Cited

U.S. PATENT DOCUMENTS

| | | |
|---|---|---|
| 5,973,594 A | 10/1999 | Baldwin |
| 6,437,692 B1 | 8/2002 | Petite |
| 6,584,113 B1 | 6/2003 | Manduley |
| 7,113,090 B1 | 9/2006 | Saylor |

(Continued)

OTHER PUBLICATIONS

First Action Interview Pilot Program Pre-Interview Communication, U.S. Appl. No. 14/710,209, dated Oct. 25, 2016.

(Continued)

*Primary Examiner* — Zewdu A Beyen

(57) ABSTRACT

A system, method and apparatus for configuring a node in a sensor network. A sensor service can enable sensor applications to customize the collection and processing of sensor data from a monitoring location. In one embodiment, sensor applications can customize the operation of nodes in the sensor network via a sensor data control system.

20 Claims, 14 Drawing Sheets

(56) References Cited

U.S. PATENT DOCUMENTS

| | | | |
|---|---|---|---|
| 7,142,107 B2 | 11/2006 | Kates | |
| 7,191,097 B1 | 3/2007 | Lee | |
| 7,379,981 B2 | 5/2008 | Elliott et al. | |
| 8,051,489 B1* | 11/2011 | Montenegro | H04L 63/065 |
| | | | 713/187 |
| 8,103,389 B2 | 1/2012 | Golden et al. | |
| 8,193,929 B1 | 6/2012 | Siu | |
| 8,339,069 B2* | 12/2012 | Chemel | H05B 37/029 |
| | | | 315/294 |
| 8,527,096 B2 | 9/2013 | Pavlak | |
| 8,548,630 B2 | 10/2013 | Grohman | |
| 8,855,825 B2 | 10/2014 | Grohman | |
| 8,874,266 B1 | 10/2014 | Francis, Jr. | |
| 8,892,797 B2 | 11/2014 | Grohman | |
| 9,146,113 B1 | 9/2015 | Funk | |
| 9,715,239 B2 | 7/2017 | Fadell | |
| 2002/0173704 A1 | 11/2002 | Schulze | |
| 2003/0083756 A1 | 5/2003 | Hsiung et al. | |
| 2005/0054289 A1 | 3/2005 | Salazar | |
| 2005/0055223 A1 | 3/2005 | Khosla | |
| 2006/0059224 A1* | 3/2006 | Yao | H04L 12/1868 |
| | | | 709/201 |
| 2006/0077607 A1 | 4/2006 | Henricks | |
| 2006/0202834 A1 | 9/2006 | Moriwaki | |
| 2007/0103324 A1 | 5/2007 | Kosuge et al. | |
| 2007/0211681 A1 | 9/2007 | Sun | |
| 2007/0225954 A1 | 9/2007 | Kodesky | |
| 2008/0195584 A1* | 8/2008 | Nath | G06F 17/30864 |
| 2008/0240105 A1 | 10/2008 | Abdallah | |
| 2008/0316048 A1 | 12/2008 | Abdallah | |
| 2009/0033513 A1 | 2/2009 | Salsbury | |
| 2009/0213245 A1 | 8/2009 | Harper | |
| 2010/0083356 A1 | 4/2010 | Steckley | |
| 2010/0141153 A1 | 6/2010 | Recker | |
| 2010/0231386 A1 | 9/2010 | Barnes | |
| 2010/0327766 A1 | 12/2010 | Recker | |
| 2011/0007665 A1 | 1/2011 | Dinur | |
| 2011/0034120 A1 | 2/2011 | Jaiyeola | |
| 2011/0040809 A1 | 2/2011 | Spanier | |
| 2011/0131320 A1 | 6/2011 | Hong | |
| 2011/0157366 A1 | 6/2011 | Padmanabh | |
| 2011/0197064 A1* | 8/2011 | Garcia Morchon | H04L 63/061 |
| | | | 713/168 |
| 2011/0248857 A1 | 10/2011 | Rutherford | |
| 2011/0276738 A1 | 11/2011 | Kim | |
| 2012/0062370 A1 | 3/2012 | Feldstein | |
| 2012/0098446 A1 | 4/2012 | Kim | |
| 2012/0155326 A1 | 6/2012 | Park et al. | |
| 2012/0161940 A1 | 6/2012 | Taylor | |
| 2012/0280832 A1 | 11/2012 | Jonsson | |
| 2012/0311413 A1 | 12/2012 | Pelletier | |
| 2013/0086245 A1 | 4/2013 | Lu | |
| 2013/0182905 A1 | 7/2013 | Myers | |
| 2013/0211557 A1 | 8/2013 | O'Brien | |
| 2013/0246005 A1 | 9/2013 | Warren | |
| 2014/0126581 A1 | 5/2014 | Wang | |
| 2014/0207290 A1 | 7/2014 | Crawford | |
| 2014/0285309 A1 | 9/2014 | Weidman | |
| 2014/0293993 A1 | 10/2014 | Ryhorchuk | |
| 2014/0334653 A1 | 11/2014 | Luna | |
| 2014/0337256 A1 | 11/2014 | Varadi | |
| 2014/0359133 A1 | 12/2014 | Tian | |
| 2015/0012147 A1 | 1/2015 | Haghighat-Kashani | |
| 2015/0021988 A1 | 1/2015 | Barnetson | |
| 2015/0029022 A1 | 1/2015 | Stebbins | |
| 2015/0043411 A1 | 2/2015 | Kim | |
| 2015/0106447 A1 | 4/2015 | Hague | |
| 2015/0200544 A1 | 7/2015 | Kitaji | |
| 2015/0316945 A1 | 11/2015 | Soya | |
| 2015/0364027 A1 | 12/2015 | Haupt et al. | |
| 2015/0381738 A1 | 12/2015 | Azuma | |
| 2016/0006264 A1 | 1/2016 | Alperin | |
| 2016/0019763 A1 | 1/2016 | Raji | |
| 2016/0112518 A1 | 4/2016 | Haleem et al. | |
| 2016/0121487 A1* | 5/2016 | Mohan | B25J 13/006 |
| | | | 700/248 |
| 2016/0193895 A1 | 7/2016 | Aich | |
| 2016/0195856 A1 | 7/2016 | Spero | |
| 2016/0241445 A1 | 8/2016 | Kim | |
| 2017/0048376 A1 | 2/2017 | Logan | |

OTHER PUBLICATIONS

First Action Interview Pilot Program Pre-Interview Communication, U.S. Appl. No. 14/967,727, dated Feb. 28, 2017.
First Action Interview Pilot Program Pre-Interview Communication, U.S. Appl. No. 14/967,832, dated Feb. 23, 2017.
First Action Interview Pilot Program Pre-Interview Communication, U.S. Appl. No. 14/862,280, dated Mar. 8, 2017.
Office Action, U.S. Appl. No. 14/710,170, dated Jul. 19, 2016.
Office Action, U.S. Appl. No. 15/145,871, dated Sep. 30, 2016.
Office Action, U.S. Appl. No. 13/344,667, dated Sep. 26, 2017.
Cloud Logger, 38 Zeros, 2015.
Smart Processing Starts at the Edge of the Network, B+B Smartworx, 2014.
Wireless Sensors and Output Devices, ConnectSense, 2015.
It's Time You Experienced Eclypse, Distech Controls, 2014.
Compact Sensor, Enlighted, 2015.
Energy Manager, Enlighted, 2015.
Gateway, Enlighted, 2015.
Enlighted Smart Sensor, 2015.
Manning, Lauren, "Wireless Infrastructure Provider Filament Closes $5m Series A, Shows Promise for Agtech Application," Aug. 21, 2015.
Intellastar, 2015.
Your Internet of Things, Monnit, 2014.
Monnit Industrial Wireless AC Current Meter, 2015.
$3^{rd}$ Generation Nest Learning Thermostat, 2015.
AcquiSuite+ Dtaa Acquisition Server, Obvius, LLC, Installation and Operation Manual, Model A8814, Jan. 11, 2014.
Application Note: ModHopper Makes Submetering Easy, Obvius, LLC, Mar. 29, 2012.
ModHopper—Wireless Modbus/Pulse Transceiver, Obvius, LLC, Installation and Operation, Model R9120 (Rev C), Dec. 11, 2012.
Atmel Corporation, 8-bit AVR Microcontroller with Low Power 2.4GHz Transceiver for ZigBee and IEEE 802.15.4, 2014.
Application Note, Atmel AT06482: Real Color ZLL LED Light Bulb with ATmega256RFR2—Software User's Guide, 2013.
Application Note, AT06412: Real Color ZLL LED Light Bulb with ATmega256RFR2—Hardware User Guide, 2014.
Exploring New Lighting Opportunities with ZigBee Light Link Webinar, May 16, 2012.
Point Six Wireless Wi-Fi Sensor Product Guide, 2015.
Eagle, Rainforest Automation, 2015.
Product Comparison Guide, SmartStruxture Lite solution and wireless devices for SmartStruxture solution, Schneider Electric, Mar. 12, 2015.
SmartStruxure Lite Solution, SEC Series, Smart Terminal Controller (SEC-TE), Schneider Electric, Aug. 1, 2013.
SmartStruxure Lite Solution, Schneider Electric, May 1, 2015.
SmartStruxture Lite Solution, Our open system approach to standards and protocols, Schneider Electric, Jul. 2, 2014.
Senseware, Mar. 25, 2014.
Product Data Sheet, SWS-DPC Wireless Pulse Counters, SpinWave Systems, Inc., 2007.
Product Data Sheet, SWC-TSTAT-3 Wireless Thermostat Controller, SpinWave Systems, Inc., 2012.
A3 Wireless Sensor Network, SpinWave Systems, Inc., 2007.
Veris Industries, 2015.
U.S. Appl. No. 62/025,640, entitled "Separation of Current Sensor and Voltage Sensor for True Power Measurement," filed Jul. 17, 2014.
Khamphanchai et al., Conceptual Architecture of Building Energy Management Open Source Software (BEMOSS), 5th IEEE PES Intelligent Smart Grid Technologies (ISGT) European Conference, Oct. 12-15, 2014.

(56) References Cited

OTHER PUBLICATIONS

DOLPHIN Core Description, EnOcean, Jul. 21, 2014.
Remote Management 2.0, EnOcean, Mar. 6, 2013.
EnOcean—The World of Energy Harvesting Wireless Technology, Feb. 2015.
Wireless Sensor Solutions for Home & Building Automation—The Successful Standard Uses Energy Harvesting, EnOcean, Aug. 10, 2007.
Metasys® System Product Bulletin, Code No. LIT-1201526, Release 7.0, Dec. 5, 2014.
Metasys® System Extended Architecture Wireless Network, Application Note, Oct. 24, 2006.
Metasys® System Field Equipment Controllers and Related Products, Product Bulletin, Code No. LIT-12011042, Software Release 5.0, Jun. 21, 2010.
ZFR1800 Series Wireless Field Bus System, Technical Bulletin, Code No. LIT-12011295, Software Release 10.1, Dec. 5, 2014.
Wireless Metasys® System Product Bulletin, Code No. LIT-12011244, Software Release 5.0, Jan. 4, 2010.
Environmental Index™—Balancing Efficiency with Comfort, Automated Logic Corporation, 2013.
Equipment Portal, Automated Logic Corporation, 2013.
EnergyReports™ Web Application—A Tool for Sustainable Building Operations, Automated Logic Corporation, 2013.
WebCTRL®—Powerful and Intuitive Front End for Building Control, Mar. 26, 2015.
iSelect Adds New Portfolio Company: Bractlet, 2015.
Know—Bractlet.
Analyze—Bractlet.
Ensure—Bractlet.
Announcing Samsara: Internet connected sensors, May 18, 2015.
Samsara—Internet Connected Sensors.
Samsara—Features.
Samsara—Models.
Samsara—API.
Press Release, Helium Makes Sense of the Internet of Things, Oct. 27, 2015.
Press Release, Helium Introduces Another Smart Sensor for Environmental Monitoring, Apr. 25, 2016.
Press Release, Helium Announces Helium Pulse Monitoring and Alerting Application, Apr. 25, 2016.
EE Times, IoT Startup Revises 802.15.4 Nets, Oct. 27, 2015.
HELIUM PULSE™ for Monitoring and Alerting, 2016.
HELIUM GREEN™ Environmental Smart Sensor, 2016.
HELIUM BLUE™ Temperature & Door Smart Sensor, 2016.
First Action Interview Pilot Program Pre-Interview Communication, U.S. Appl. No. 14/710,711, dated Jun. 16, 2016.
Office Action, U.S. Appl. No. 14/710,191, dated Jul. 20, 2016.
First Action Interview Pilot Program Pre-Interview Communication, U.S. Appl. No. 14/710,766, dated Jun. 24, 2016.
Office Action, U.S. Appl. No. 15/389,626, dated Jul. 14, 2017.
First Action Interview Pilot Program Pre-Interview Communication, U.S. Appl. No. 15/145,884, dated Jun. 19, 2017.
Office Action, U.S. Appl. No. 15/388,056, dated Jul. 20, 2017.
Office Action, U.S. Appl. No. 14/710,247, dated Jan. 12, 2017.
First Action Interview Pilot Program Pre-Interview Communication, U.S. Appl. No. 14/710,652, dated Jun. 16, 2017.
First Action Interview Pilot Program Pre-Interview Communication, U.S. Appl. No. 14/945,506, dated Mar. 3, 2017.
First Action Interview Pilot Program Pre-Interview Communication, U.S. Appl. No. 15/006,439, dated Mar. 15, 2017.
Office Action, U.S. Appl. No. 15/694,911, dated Apr. 5, 2018.
Office Action, U.S. Appl. No. 16/57,171, dated Apr. 23, 2018.
Office Action, U.S. Appl. No. 15/790,123, dated Jul. 25, 2018.
Office Action, U.S. Appl. No. 14/710,652, dated Nov. 16, 2018.

\* cited by examiner

SYSTEM, METHOD AND APPARATUS FOR CONFIGURING A NODE IN A SENSOR NETWORK

This application is a continuation-in-part of non-provisional application Ser. No. 14/862,280, filed Sep. 23, 2015, which is a continuation-in-part of non-provisional application Ser. No. 14/710,170, filed May 12, 2015, non-provisional application Ser. No. 14/710,191, filed May 12, 2015, non-provisional application Ser. No. 14/710,209, filed May 12, 2015, non-provisional application Ser. No. 14/710,247, filed May 12, 2015, non-provisional application Ser. No. 14/710,652, filed May 13, 2015, non-provisional application Ser. No. 14/710,711, filed May 13, 2015, and non-provisional application Ser. No. 14/710,766, filed May 13, 2015. Non-provisional application Ser. Nos. 14/710,170, 14/710,191, 14/710,209, 14/710,247, 14/710,652, 14/710,711, 14/710,766 each claim the benefit of and priority to provisional application No. 61/992,307, filed May 13, 2014, and to provisional application No. 62/136,959, filed Mar. 23, 2015. Each of the above-identified applications is incorporated herein by reference in its entirety.

BACKGROUND

Field

The present disclosure relates generally to sensor applications, including a system, method and apparatus for configuring a node in a sensor network.

Introduction

Sensors can be used to monitor physical environment conditions. Wireless sensor networks can be used to collect data from distributed sensors and to route the collected sensor data to a central location.

BRIEF DESCRIPTION OF THE DRAWINGS

In order to describe the manner in which the above-recited and other advantages and features can be obtained, a more particular description will be rendered by reference to specific embodiments thereof which are illustrated in the appended drawings. Understanding that these drawings depict only typical embodiments and are not therefore to be considered limiting of its scope, the disclosure describes and explains with additional specificity and detail through the use of the accompanying drawings in which.

DETAILED DESCRIPTION

Various embodiments are discussed in detail below. While specific implementations are discussed, it should be understood that this is done for illustration purposes only. A person skilled in the relevant art will recognize that other components and configurations may be used without parting from the spirit and scope of the present disclosure.

Sensors provide a mechanism for discovering and analyzing a physical environment at a monitored location. In general, a monitored location can represent any area where one or more sensors are deployed. The monitored location may or may not represent a physical area having clearly defined boundaries. As would be appreciated, the extent of the sensor application itself provides a sense of boundary to the monitored location. In one example, the monitored location can represent a building such as a home, hotel, industrial facility, school, hospital, community building, stadium, airport, convention center, warehouse, office building, mall, shopping center, data center, multi-dwelling unit, or other defined building structure. In another example, the monitored location can represent an area of control such as a vehicle or container in any mode of transport, an asset collection area, a construction zone, or any monitored area that can be fixed or movable. In yet another example, the monitored location can represent an area proximate to an article, device, person or other item of interest upon which one or more sensors are attached.

Figure 1:
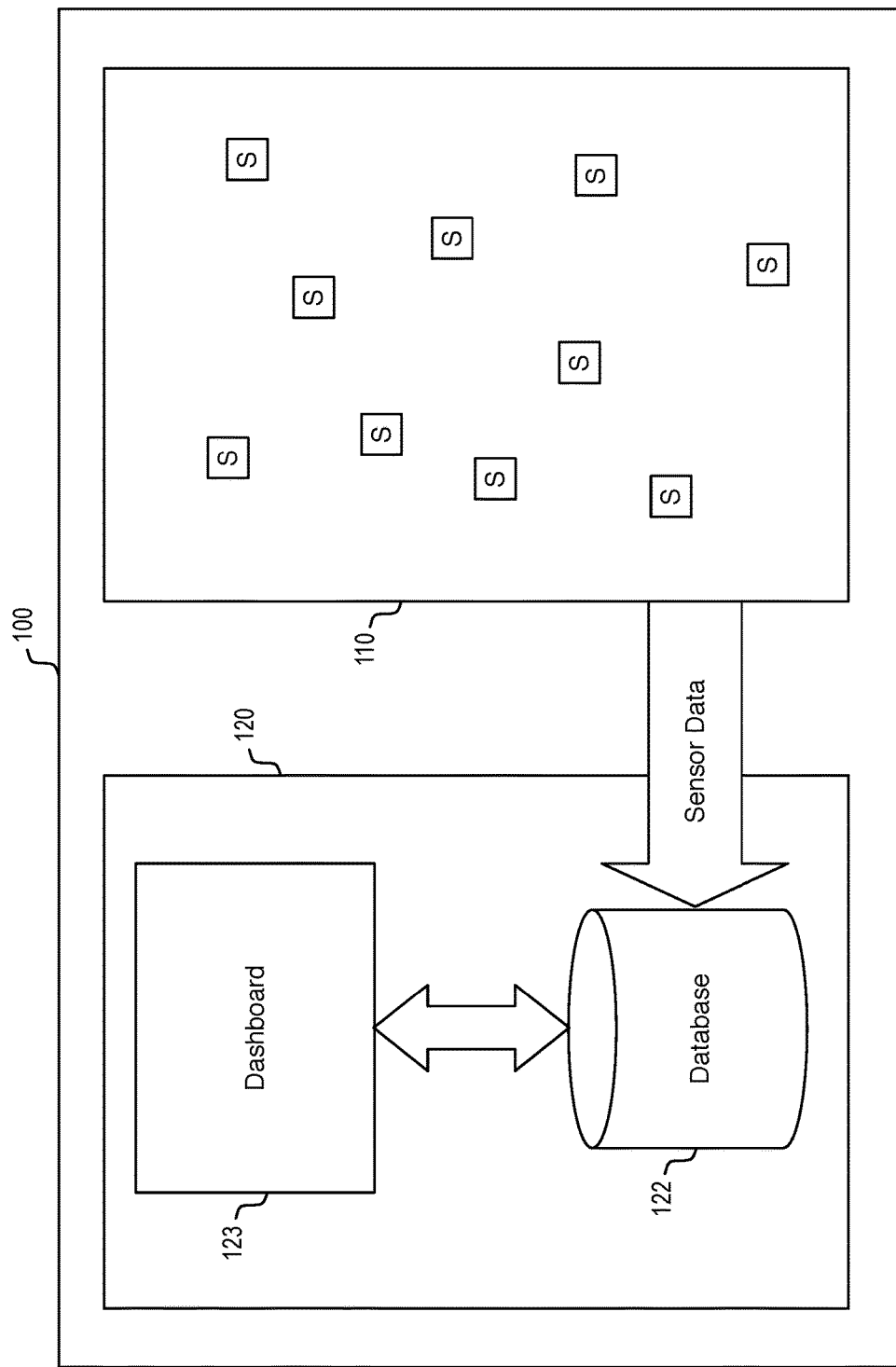
FIG. 1 illustrates an example of a sensor data management system.

FIG. 1 illustrates an example of the collection and analysis of data from sensors installed at a monitored location. As illustrated, sensor data management system 100 collects sensor data from a plurality of sensors installed at monitored location 110. This collection portion of sensor data management system 100 provides sensor data to control and analysis portion 120. Control and analysis portion 120 includes database 122 for storage of the collected sensor data. Dashboard 123 can be embodied as an online platform that allows a customer to view the sensor data from monitored location 110. Dashboard 123 can therefore represent a management tool authored by sensor data management system 100 that helps promote customer understanding of the sensor data.

In one example, sensor data management system 100 can represent an end-to-end solution provided by a single vendor that enters into a service contract with a customer. Under the terms of the contract, the vendor can install the sensor hardware at monitored location 110, collect, process and store sensor data in database 122, and provide the customer with visibility to the sensor data via dashboard 123. In this example framework, the vendor would operate and otherwise control all aspects of sensor data management system 100 in providing a single-vendor solution to the customer. This single-vendor solution may not enable a full implementation of sensors as a service.

Notably, the customer would have a relationship with the single vendor that installed the sensor hardware at monitored location 110. This single vendor would control access to the sensor data in database 122. The vendor's dashboard 123 would therefore represent the only means by which a customer can view the sensor data. A consequence of this restriction is that the customer is reliant on the vendor's dashboard for every aspect of analytics and other functionality needed by the customer. Dashboard 123 would necessarily be positioned as an all-encompassing solution. Rarely are such solutions optimized for the range of solutions required for the particular needs of a variety of customers. For example, the vendor's dashboard may have industry-leading functionality in a first area, while having average functionality in a second area. Since the customer has a relationship with the single vendor for a single solution, the customer would have difficulty leveraging industry-leading functionality offered by a second vendor in the second area. Moreover, the customer would not be able to change to the second vendor because the first vendor effectively owns the sensor hardware installed at the monitored location. A suboptimal solution for the customer therefore results.

In the present disclosure it is recognized that single-vendor solutions can potentially impede the creation of sensors as a service. The deployment of individual sensors at a monitored location is part of the growing trend of the Internet of Things (IoT). The connectivity of the individual sensors through a wireless sensor network enables inclusion of those sensors as part of an open network. A single-vendor solution unfortunately restricts access to the sensors as well as to the data collected by them. In contrast, the sensors as a service model seeks to promote the open usage of the sensors and the data collected by them to any party having an interest in at least part of the monitored location.

Figure 2:
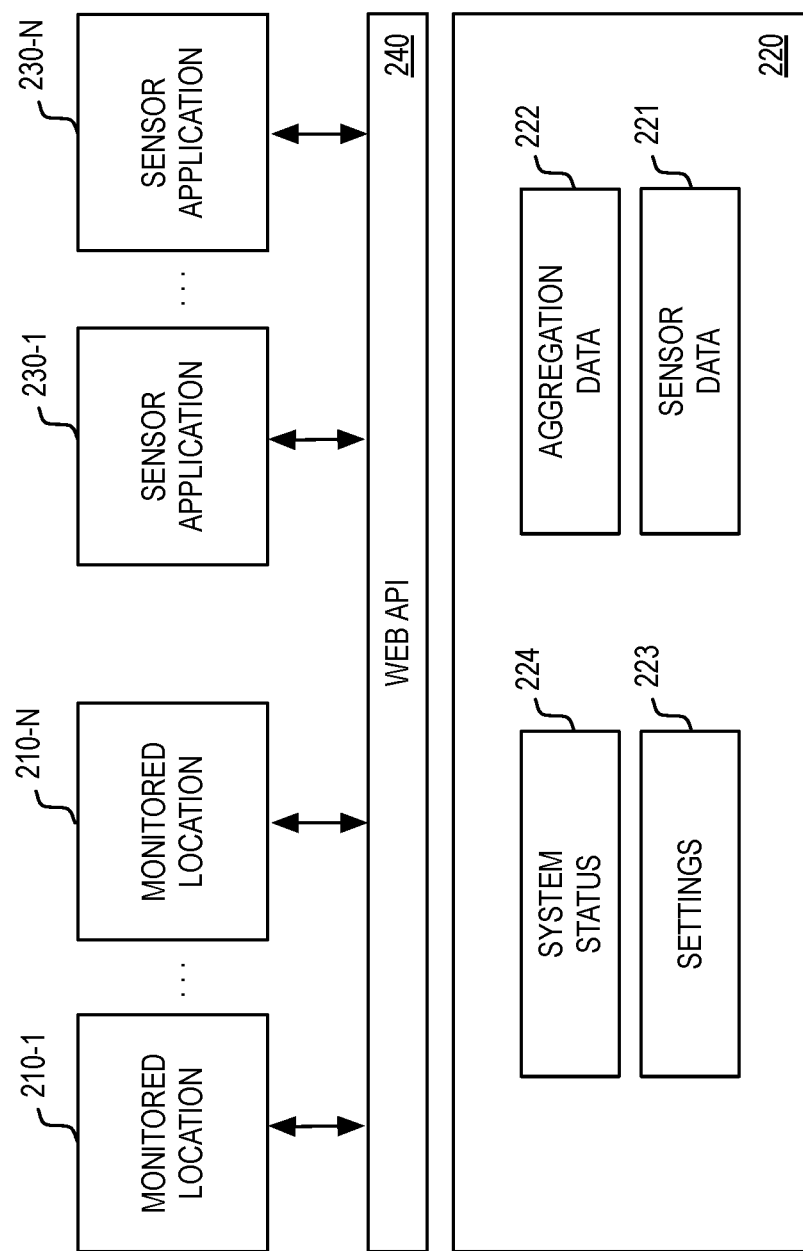
FIG. 2 illustrates an example framework that enables discrete sensor application development in a sensors as a service model.

FIG. 2 illustrates an example framework that enables discrete sensor application development in a sensors as a service model. Central to this sensors as a service model is sensor data control system 220. In general, one or more servers in sensor data control system 220 can be configured to facilitate the various processes that enable a collection of sensor data from the plurality of monitored locations 210-$n$, processing and storage of sensor data in a database, and a distribution of sensor data to a plurality of sensor applications 230-$n$. The plurality of monitored locations 210-$n$ and the plurality of sensor applications 230-$n$ can interface with sensor data control system 220 via web application programming interface (API) 240. In one embodiment, web API 240 would be based on HTTP methods such as GET, PUT, POST, and DELETE.

As illustrated, sensor data control system 220 can collect sensor data from the plurality of monitored locations 210-$n$ via web API 240. For example, sensor data control system 220 can receive the latest sensor readings using HTTP POST methods from the plurality of monitored locations 210-$n$. Via web API 240, sensor data control system 220 can collect a first set of sensor data from a first plurality of sensors installed at a first monitored location, collect a second set of sensor data from a second plurality of sensors installed at a second monitored location, ... and collect an $N^{th}$ set of sensor data from an $N^{th}$ plurality of sensors installed at an $N^{th}$ monitored location. The N collected sets of sensor data can be stored in a database as sensor data 221. In one embodiment, aggregation data 222 can also be generated by sensor data control system 220 based on sensor data 221. In general, aggregation data 222 can represent any processed form of sensor data 221.

In one application, a sensor data value can be transformed via a defined conversion relationship into a single aggregation data value. For example, a number of detected pulses can be transformed using a defined conversion relationship into a measure of consumption (e.g., power). In another application, a plurality of sensor data values can be processed through a defined conversion relationship into a single aggregation data value. For example, a plurality of sensor data values can be analyzed to determine whether an alert should be triggered. In another example, a plurality of sensor data values such as voltage and current can be processed to produce a measure of power. In yet another scenario, a plurality of sensor data values can be grouped together into an aggregation of data values. For example, a plurality of sensor data values can be grouped together to produce a customer report.

Sensor data 221 and/or aggregation data 222 are accessible by a plurality of sensor applications 230-$n$ via web API 240. More specifically, sensor data control system 220 can provide a first set of sensor data 221 and/or aggregation data 222 upon request by a first sensor application, provide a second set of sensor data 221 and/or aggregation data 222 upon request by a second sensor application, ... and provide an $N^{th}$ set of sensor data 221 and/or aggregation data 222 upon request by an $N^{th}$ sensor application. Each of the distributed sets of sensor data 221 and/or aggregation data 222 can support the respective needs of the requesting sensor application 230-$n$. The respective needs can relate to all or part of one or more monitored locations 210-$n$. The scope of a sensor application 230-$n$ in meeting a particular customer need would dictate the amount of sensor data 221 and/or aggregation data 222 that is provided.

In one scenario, the set of sensor data 221 and/or aggregation data 222 can relate to a specific set of sensors in a part of a monitored location 210-$n$ occupied by a building tenant. In another scenario, the set of sensor data 221 and/or aggregation data 222 can relate to a particular type of sensors (e.g., power) in one or more monitored locations 210-$n$. In yet another scenario, the set of sensor data 221 and/or aggregation data 222 can relate to a subset of sensors in a particular monitored location over a specified time period (e.g., day, week, month, or other defined period of time) to perform an audit of conditions of the physical environment at that monitored location. Here, it should also be noted, that the set of sensor data 221 and/or aggregation data 222 provided to a first sensor application can overlap in part with the set of sensor data 221 and/or aggregation data 222 provided to a second sensor application.

As would be appreciated, a distributed set of sensor data 221 and/or aggregation data 222 can be customized to the needs of a particular sensor application 230-$n$. In that way, the systematic collection, processing and storage of sensor data by sensor data control system 220 can be viewed as a sensor service from the perspective of sensor applications 230-$n$. Significantly, any sensor application 230-$n$ can request data associated with any sensor at any monitored location 210-$n$ over any time period via web API 240. New sensor applications can continually be developed for analysis of sensor data 221 and/or aggregation data 222, thereby increasingly leveraging sensor data 221 and aggregation data 222. Sensor data control system 220 can therefore be positioned as a sensor data service platform upon which front-end sensor applications 230-$n$ can be built.

In implementing a full-featured sensor service, sensor data control system 220 can also enable sensor applications 230-$n$ to customize the collection and processing of sensor data. This customization increases the adaptability and flexibility of the sensor service in meeting the needs of the sensor applications 230-*n*. In one embodiment, sensor applications 230-*n* can customize the operation of sensor data control system 220 using web API 240. These customizations can be stored in a database as settings 223.

In one example, a sensor application 230-*n* can specify a conversion function via web API 240 for application to one or more values of sensor data. The conversion function can be stored in the database as settings 223 and applied to one or more values of sensor data 221 to produce one or more values of aggregation data 222. In this manner, a sensor application 230-*n* can specify one or more conversion functions that are configured to prepare a set of inputs for use by the sensor application 230-*n*. One advantage of the specification of such conversion functions is that the sensor application 230-*n* is assured of receiving data of a known type, of a known quantity, of a known accuracy, of a known format, or of any other expected characteristic for processing by the sensor application 230-*n*. In one scenario, this can be used to ensure that sensor application 230-*n* can be easily repurposed from another sensor application environment to the particular sensor service supported by sensor data control system 220. In general, the conversion functions can be used to create standardized outputs from data generated by different types of sensors. Another advantage of the specification of such conversion functions is that the sensor application 230-*n* can be designed to operate at a specified level of complexity relative to sensor data control system 220. In one scenario, sensor application 230-*n* can offload analysis functions to sensor data control system 220, thereby enabling the sensor application to perform simple functions (e.g., alerts) on received aggregation data 222. This scenario would be useful in allowing sensor application 230-*n* to be implemented as a light-weight sensor application 230-*n* for download and installation on a mobile computing device. This would be in contrast to a full-featured sensor application 230-*n* that is intended for installation on a server device and which is designed for heavy-duty processing and analysis functions. As would be appreciated, conversion functions can be used to facilitate a customized interaction between a sensor application 230-*n* and sensor data control system 220.

In another example, a sensor application 230-*n* can specify destinations for the distribution of sensor data 221 and/or aggregation data 222. For example, a sensor application 230-*n* can specify that separate subsets of sensor data 221 and/or aggregation data 222 are distributed to different destinations. In this framework, the separate subsets of sensor data 221 and/or aggregation data 222 may or may not correspond to distinct physical parts of a monitored location. More generally, each subset of sensor data 221 and/or aggregation data 222 can relate to a separate interest by a sensor application to sensor data 221 and/or aggregation data 222 produced by one or more monitored locations. In one embodiment, sensor data 221 and/or aggregation data 222 can be distributed to defined destinations using JavaScript Object Notation (JSON) formatted packets.

In another example, a sensor application 230-*n* can specify, via web API 240, configuration settings for application to a sensor network at a monitored location 210-*n*. The control provided by the specification of these configuration settings via web API 240 enables a sensor application 230-*n* to remotely configure a sensor network at a monitored location 210-*n*. In various scenarios, the remote configuration commands would customize the operation of a sensor network at a monitored location 210-*n* to meet the needs of a given sensor application 230-*n*.

In one example, the customization of the operation of a monitored location 210-*n* can include an activation or deactivation of a sensor at the monitored location 210-*n*. This activation or deactivation can correspond to particular hours, days, weeks, months, or other periods of time. In one scenario, the activation or deactivation commands can correspond to relevant periods of interest in the sensor data, wherein the relevant periods of interest correspond to activity relating to tenant occupancy, auditing, monitoring and verification, sales support, or other activities that have non-contiguous periods of interest and/or control.

In another example, the customization of the operation of a monitored location 210-*n* can include a change in the operation of a sensor at the monitored location 210-*n*. In various scenarios, the change in operation of the sensor can relate to a sensitivity characteristic, an accuracy characteristic, a power characteristic, an energy saving characteristic, an operating mode characteristic, a data type or format characteristic, or any other characteristic that relates to an operation of the sensor or the data produced by the sensor. In one embodiment, the sensor is supported by a sensor module unit having an interface to the sensor (e.g., Modbus serial communication protocol). In this embodiment, the change in operation can relate to a device address, a function code, a register address, or any other parameter that facilitates a collection of sensor data via the interface. As would be appreciated, the specific interface supported by the sensor module unit would be implementation dependent.

In another example, the customization of the operation of a monitored location 210-*n* can include a change in the operation of a node in a sensor network at the monitored location 210-*n*. In various scenarios, the customization can relate to a frequency of sensor data collection, a sampling frequency, a power characteristic, an energy saving characteristic, an operating mode characteristic (e.g., reset command), a data type or format characteristic, or any other characteristic that relates to an operation of the node.

After customization commands have been forwarded to a monitored location 210-*n*, the monitored location 210-*n* can return system update information via web API 240. This system update information can be recorded in the database as system status 224. A sensor application 230-*n* can then retrieve system status information from sensor data control system 220 via web API 240 to confirm that the requested configuration changes have been correctly implemented by the sensor network at the monitored location 210-*n*.

The configuration afforded via web API 240 enables a sensor application 230-*n* to customize the operation of a sensor network from a location remote from the monitored location 210-*n*. Notably, the sensor application 230-*n* can customize the operation of only part of the sensor network at a monitored location 210-*n*. For example, a first sensor application can be configured to provide an energy management company with a view of sensor data relating to power consumption at a building, while a second sensor application can be configured to provide a tenant in the building with a view of sensor data relating to ambient conditions (e.g., temperature and humidity) in a part of the building. As these examples illustrate, a plurality of sensor applications 230-*n* can be configured to leverage different subsets of sensors at one or more monitored locations 210-*n*. From that perspective, sensor data control system 220 provides a sensor service to a plurality of sensor applications 230-*n* having varied interests into the detected physical environment at the various monitored location 210-*n*.

Figure 3:
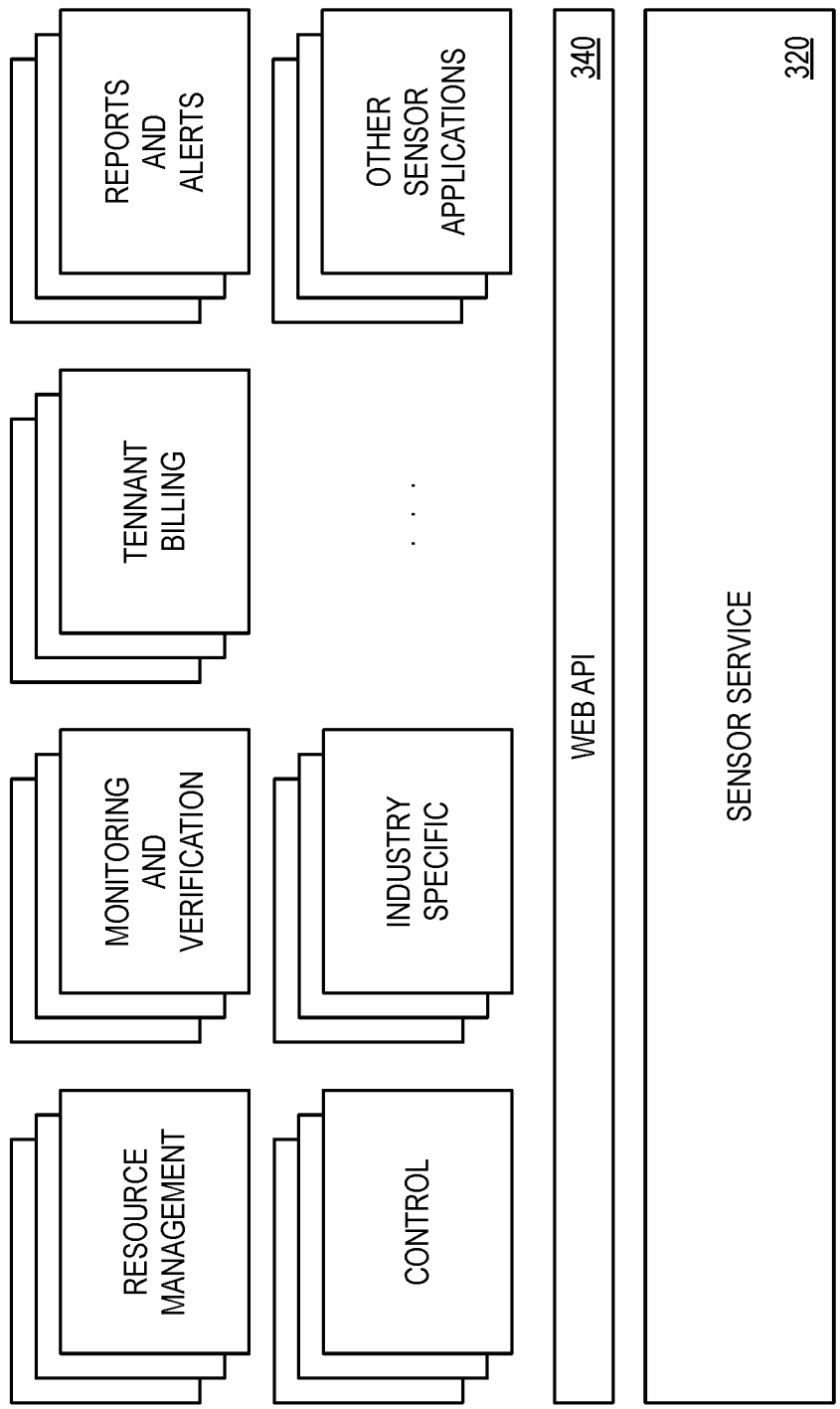
FIG. 3 illustrates example sensor applications that leverage a sensor service accessible via a network.

FIG. 3 illustrates example sensor applications that can leverage a sensor service accessible via a network. As illustrated, sensor service 320 can be accessible by a plurality of sensor applications via web API 340. In one example, sensor service 320 can be embodied as a sensor data control system such as that described with reference to FIG. 2. As noted, a sensor data control system can be configured to control the collection, processing, storage, and distribution of sensor data received from a plurality of monitored locations. The database of sensor data and aggregation data for the plurality of monitored locations can be leveraged by any application having an interest in any part of a detected physical environment reflected by the sensor data and/or aggregation data. Once installed, the sensor networks at the plurality of monitored locations become part of a sensor network infrastructure that can serve the needs of any interested party, whether or not the interested party was involved in the original deployment of the sensor networks.

Sensor service 320 can be used by a variety of sensor applications that can be designed to meet customer needs at any level of granularity. In the present disclosure, it is recognized that sensor service 320 can support a marketplace or solution store of sensor applications. In this framework, a sensor application provider can offer their sensor application to any customer having an interest in any part of a detected physical environment reflected by sensor data and/or aggregation data offered by sensor service 320.

To illustrate this marketplace framework, consider an example of a tenant that signs a lease for office space in a building. The tenant could use a first sensor application that provides energy management functionality, use a second sensor application that provides tenant billing features, and use a third sensor application that provides reports on ambient conditions in a climate-controlled storage area. As this example illustrates, the tenant can select a particular set of sensor applications to provide the analytics and other information the tenant needs during occupancy of the leased space. Should a new tenant lease the same space, the new tenant can then select a different set of sensor applications to meet their own particular needs during occupancy of the leased space.

As illustrated in FIG. 3, a marketplace for sensor applications can be segmented into a plurality of categories. A first example category can include Resource Management sensor applications that can each be configured to manage consumable resources such as electricity, water, gas, storage space, office space, conference rooms, or any other measured resource. A second example category can include Monitoring and Verification sensor applications that can each be configured to monitor and verify operation of a system (e.g., HVAC) in a monitored location. In one example, a monitoring and verification application can be used to perform audits of a system in a monitored location. A third example category can include Tenant Billing sensor applications that can each be configured to generate bills for tenants for measured usage of some resource (e.g., electricity). A fourth example category can include Reports and Alerts sensor applications that can each be configured to perform compilation and analysis of sensor data and/or aggregation data. In one example, an alert sensor application can include complex analytic functions that can predict occurrence of future maintenance actions at a monitored location based on historical data produced by one or more sensors. A fifth example category can include Control sensor applications that can each be configured to implement a control action based on an analysis of sensor data and/or aggregation data. In one example, a control sensor application can be configured to restrict usage of a consumable resource based on an analysis of current usage relative to a budget. A sixth example category can include Industry Specific sensor applications that are targeted to a particular industry context. For example, a first set of sensor applications can be specifically directed to the particular needs of schools, while a second set of sensor applications can be specifically directed to the particular needs of condominium buildings. As these example categories illustrate, sensor service 320 can support the development of discrete sensor applications that can be applied to any defined market segment. In general, the particular functionality needed by a customer can define a new category of sensor applications. Sensor service 320 supports the development of discrete sensor applications to meet any customer need. In comparison to a one-size-fits-all model, discrete sensor applications enable efficient and cost-effective solutions for customers.

Figure 4:
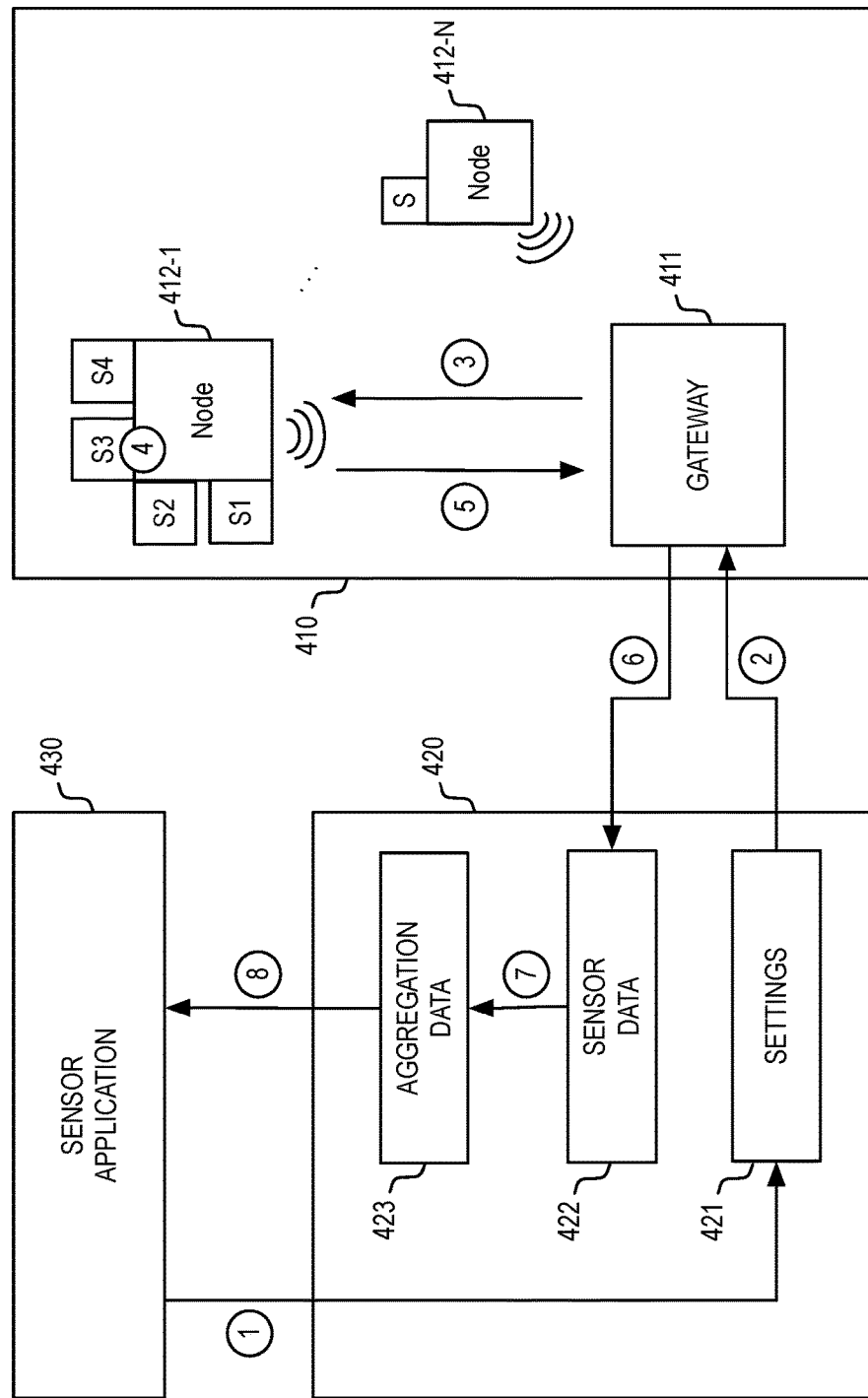
FIG. 4 illustrates a first example of a sensor application process.

To illustrate the operation of a sensor data control system in providing a sensor service, reference is now made to FIG. 4, which illustrates a first example of a sensor application process. As illustrated, monitored location 410 includes gateway 411, which communicates with sensor data control system 420 via a network connection. The network connection can be embodied in various forms depending upon the particular characteristics of monitored location 410. For example, where monitored location 410 is a building in a developed area, then the network connection can be facilitated by a wired Internet connection via an Internet service provider (ISP). In another example, the network connection can be facilitated by a terrestrial or satellite based wireless network to accommodate a remote physical area (or movable area) that may or may not include a building structure. Here, it should be noted that multiple gateways can be used at a monitored location, wherein each gateway supports a different set of nodes and has a separate network connection to an operation center.

In one embodiment, gateway 411 communicates wirelessly with a plurality of nodes 412-$n$ that form a wireless mesh network. In one embodiment, the communication protocol between the plurality of nodes 412-$n$ is based on the IEEE 802.15.4 protocol. The wireless mesh network can be used to facilitate bi-directional communication between sensor data control system 420 and the plurality of nodes 412-$n$. Prior to describing the details of the sensor application process of FIG. 4, a description of example sensor network components is first provided.

Figure 5:
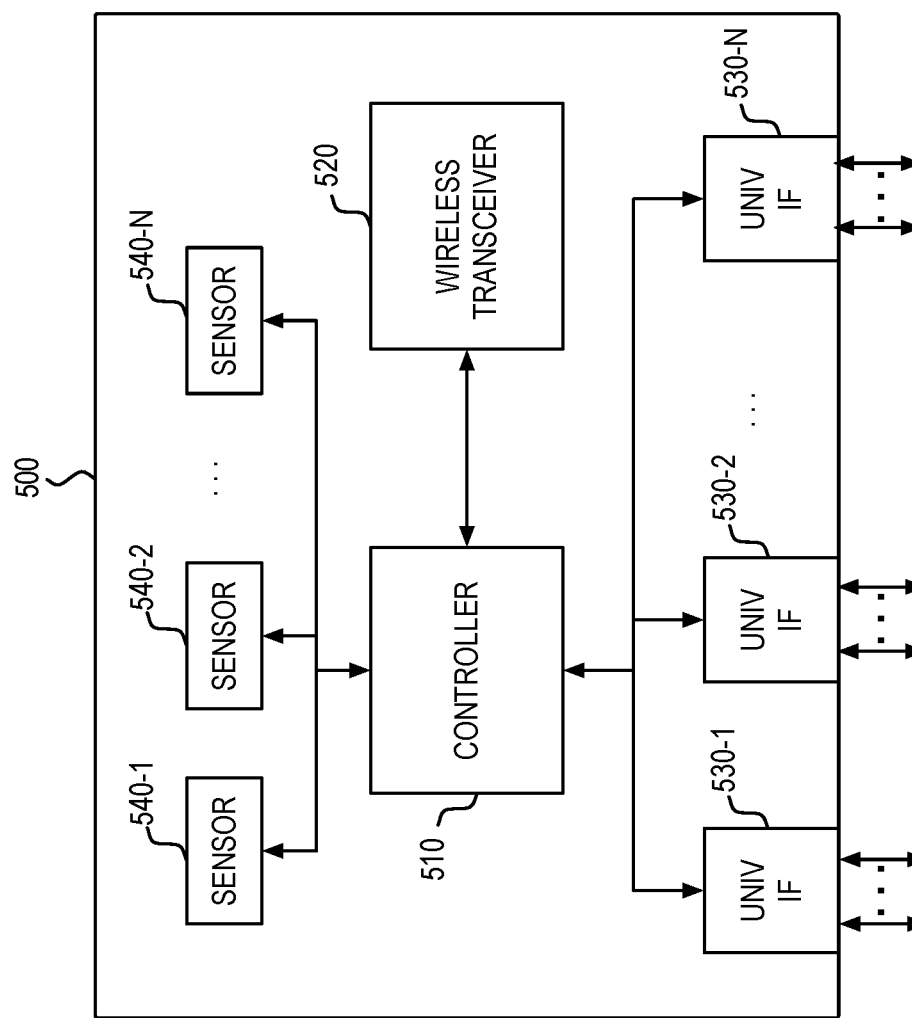
FIG. 5 illustrates an example embodiment of a node device.

FIG. 5 illustrates an example embodiment of a node device in the sensor network. As illustrated, node device 500 includes controller 510 and wireless transceiver 520. Wireless transceiver 520 facilitates wireless communication between node device 500 and a gateway or another node that operates as a relay between node device 500 and the gateway. In one embodiment, node device 500 includes a wired transceiver (e.g., Ethernet) in addition to or as a replacement for wireless transceiver 520. The wired transceiver would enable node device 500 to communicate with a gateway over a wired link.

Controller 510 collects sensor measurements from a set of sensor module units via one or more universal sensor interfaces 530-$n$. Controller 510 can also collect measurements from one or more sensors 540-$n$ that are contained within or otherwise supported by a housing of node device 500. In various scenarios, the one or more sensors 540-$n$ can facilitate monitoring at that part of the monitored location, including the health and/or status of node device 500. Each universal sensor interface 530-$n$ can support the connection of node device 500 with a separate sensor module unit. The plug-and-play universal sensor interface facilitates the separation of the node communication infrastructure from the set of one or more sensor module units that are deployed at the location at which the supporting node is installed.

Universal sensor interfaces 530-*n* can represent a combination of hardware and software. The hardware portion of universal sensor interfaces 530-*n* can include a wired interface that enables communication of different signals between node device 500 and a connected sensor module unit. In one example, the wired interface can be enabled through a connector interface, which is exposed by the housing of node device 500, and that is configured to receive a sensor module unit connector via removable, pluggable insertion.

In one embodiment, the wired interface can be based on a Serial Peripheral Interface (SPI) bus. In one example, the wired interface enables six connections: supply, ground, data in, data out, clock, and device select. The device select connection can be unique to each wired interface and can enable controller 510 in node device 500 to select the particular sensor module unit with which node device 500 desires to communicate.

The software portion of the universal sensor interfaces 530-*n* can include a protocol that allows node device 500 to communicate with a sensor module unit. In one example protocol, controller 510 can be configured to poll the various universal sensor interfaces 530-*n* to determine whether any sensor module units are connected. As part of this protocol, controller 510 can first request a sensor ID from a sensor module unit. If the response read is "0", then controller 510 would know that no sensor module unit is connected to that universal sensor interface 530-*n*. If, on the other hand, the response read is not "0", then controller 510 would ask for the number of data values that have to be retrieved and the number of bits on which the data values are coded. In one example, the higher order 8-bits of a 16-bit communication between controller 510 and a sensor module unit identifies the number of data values, while the lower order 8-bits of the 16-bit communication identifies the number of bits used to code each data value. Based on the number of data values to be retrieved, controller 510 would then collect that number of data values, wherein each value can represent a different sensor channel of the sensor module unit.

Figure 6:
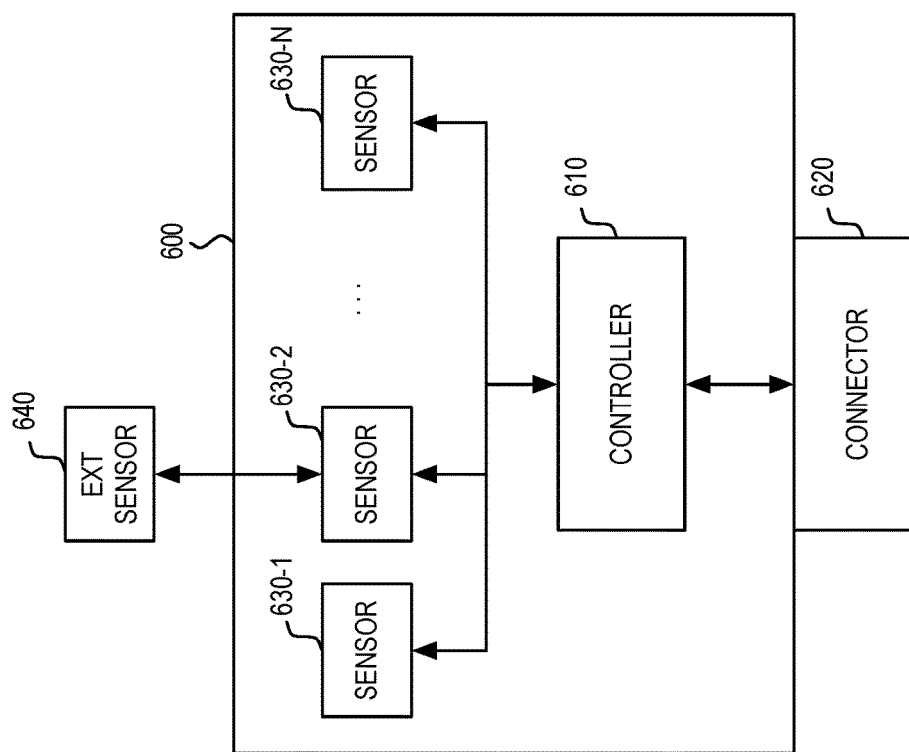
FIG. 6 illustrates an example embodiment of a sensor module unit.

FIG. 6 illustrates an example embodiment of a sensor module unit designed for attachment to a node device, an example of which was described with reference to FIG. 5. As illustrated, sensor module unit 600 includes controller 610 that communicates over a universal sensor interface with a supporting node device. In one embodiment, sensor module unit 600 supports the universal sensor interface with a connector 620 configured for pluggable, removable insertion into a corresponding connector interface exposed by the supporting node device. In another embodiment, the sensor module unit can be coupled to the connector interface exposed by the supporting node device via a connector attached to a cable.

Sensor module unit 600 can support a plurality of sensors 630-*n*. For example, sensors supported by sensor module unit 600 can enable one or more of the following: a temperature sensor application, a humidity sensor application, an air quality (e.g., $CO_2$) sensor application, a light sensor application, a sound sensor application, an occupation sensor application, a radiation sensor application, a contact sensor application, a pulse sensor application, a water sensor application, a power sensor application, a credential sensor application, or any other type of sensor application configured to measure a characteristic associated with a physical environment of a part of the monitored location.

In one embodiment, a sensor can cooperate with an external sensor element to produce sensor data. For example, sensor 630-2 can cooperate with external sensor element 640 to gather energy monitoring data. In one scenario, sensor 630-2 can be embodied as a pulse sensor that is configured to connect to an external energy monitoring meter product. In another scenario, sensor 630-2 can communicate with external sensor element 640 via a Modbus interface, BACnet interface, or any other interface designed for communication with a monitoring product. As would be appreciated, the particular method of cooperation between internal and external sensor elements supported by sensor module unit 600 would be implementation dependent.

Figure 7:
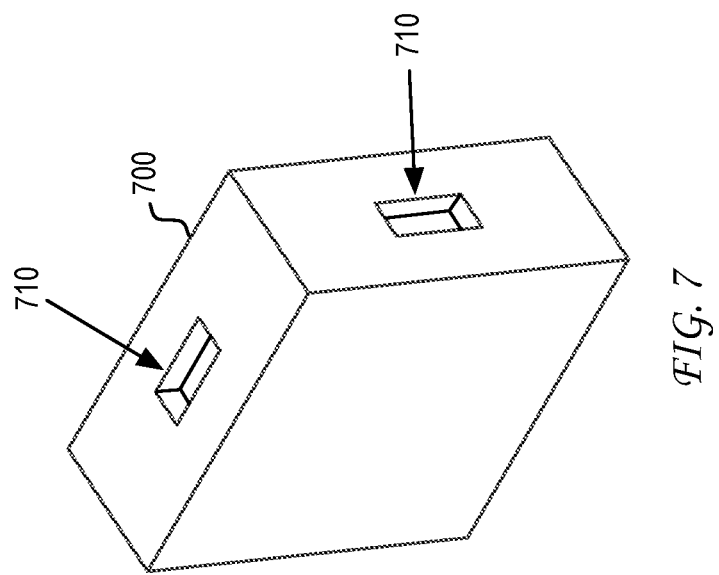
FIG. 7 illustrates an example embodiment of a housing of a node device that exposes connector interfaces.

The plug-and-play nature of the connection of sensor module units to supporting node devices facilitates a modular framework for installation of nodes at a monitored location. FIG. 7 illustrates an example embodiment of a housing of a node device such as the example illustration of node device 500 in FIG. 5. As illustrated, node device 700 can have a housing configured to expose a plurality of connector interfaces 710. Each of the plurality of connector interfaces 710 can support the physical attachment of a single sensor module unit. In the example illustration, each side of the housing of node device 700 exposes a single connector interface 710. In the present disclosure, it is recognized that the housing of the node device can be substantially larger than the housing of the sensor module unit. This can result, for example, because the node device can be designed with additional components such as an internal power source (e.g., battery) that can involve additional volume requirements as compared to the sensor module units. It is therefore recognized that one embodiment of a node device can have multiple sensor module units physically attached to a single side of the node device.

Figure 8:
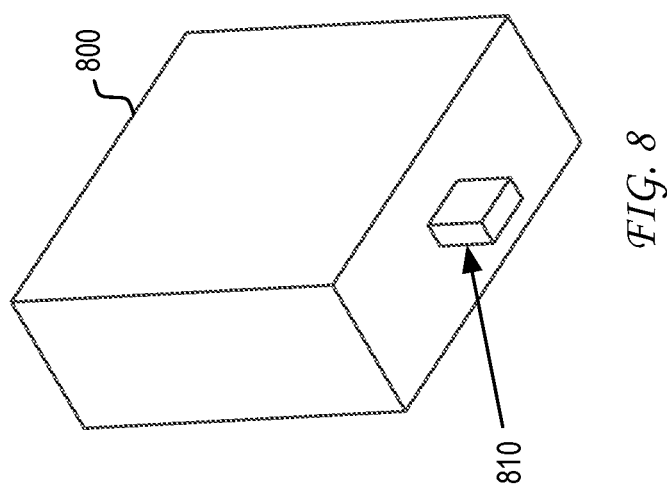
FIG. 8 illustrates an example embodiment of a housing of a sensor module unit.

FIG. 8 illustrates an example embodiment of a housing of a sensor module unit such as the example illustration of sensor module unit 600 in FIG. 6. As illustrated, sensor module unit 500 can have a housing configured to support a connector 810. Connector 810 can be configured for pluggable, removable insertion into a corresponding connector interface 710 exposed by the housing of node device 700. The connection of sensor module unit 800 to node device 700 via the insertion of connector 810 into connector interface 710 produces a true plug-and-play framework for the deployment of sensors at a monitored location.

Figure 9:
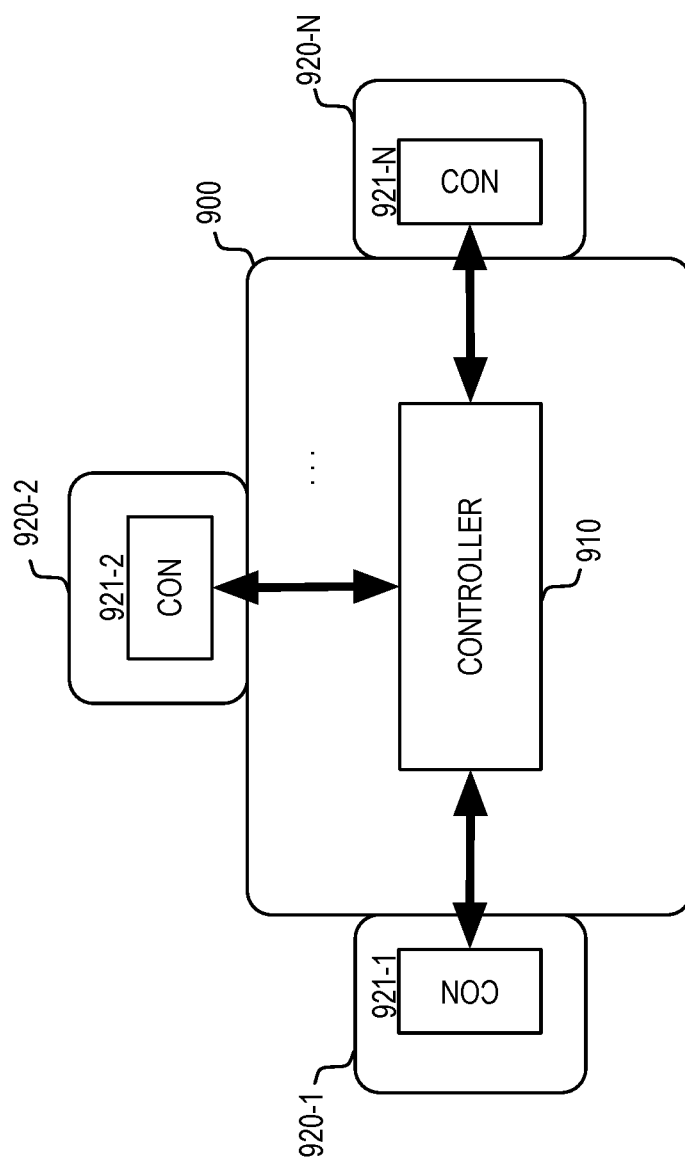
FIG. 9 illustrates an example embodiment of a node device attached to a plurality of sensor module units.

FIG. 9 illustrates an example data flow between a node device, such as the example illustration of node device 500 in FIG. 5, and a plurality of supported sensor module units. As illustrated, node device 900 interfaces with a plurality of sensor module units, including sensor module unit 920-1, sensor module unit 920-2, . . . , and sensor module unit 920-N. Connectors of sensor module unit 920-1, sensor module unit 920-2, . . . , and sensor module unit 920-N are each physically attached to separate connector interfaces exposed by the housing of node device 900. The attachment of sensor module unit 920-1 to node device 900 enables communication of data between controller 921-1 and controller 910, the attachment of sensor module unit 920-2 to node device 900 enables communication of data between controller 921-2 and controller 910, . . . , and the attachment of sensor module unit 920-N to node device 900 enables communication of data between controller 921-N and controller 910. By these attachments, each of sensor module units 920-1, 920-2, . . . , and 920-N can be coupled to node device 900 via a universal sensor interface having the connectivity characteristics described above.

As noted, the network formed by node devices at a monitored location creates a communication infrastructure. This communication infrastructure enables the various sensors supported by a plurality of sensor module units dispersed around the monitored location to communicate with a gateway device at the monitored location. The gateway device can interface with a sensor data control system via a public network.

Having described the details of the sensor network components at a monitored location, a detailed description of the example sensor application process of FIG. 4 is now provided. In this example, assume that sensor application 430 requires (1) data from sensor readings from sensors in sensor module unit S3 attached to node device 412-1 to be taken every 60 seconds, (2) a voltage measurement and current measurement to be combined into a power measurement, and (3) the resulting power measurement data to be placed into a particular data format for input into an analytics module of sensor application 430. In various scenarios, the data format can relate to singular data values and/or can relate to multiple data values in the context of a report.

As illustrated, the process can begin with the communication by sensor application 430 of configuration settings to sensor data control system 420. This part of the process is illustrated as process element "1" in FIG. 4. Sensor application 430 can submit configuration settings to sensor data control system 420 via web APIs. The submitted configuration settings can be stored in a database as settings 421, and can be used as the basis for adjusting the configuration of the sensor network at monitored location 410 and to adjust the processing of sensor data 422 received from monitored location 410. In this example, a first configuration setting can be stored that would be the basis for modifying a data collection period of the sensors in sensor module unit S3 attached to node 412-1, a second configuration setting can be stored that would be the basis for a conversion function for generation of a power measurement from a voltage measurement and current measurement taken by the sensors in sensor module unit S3 attached to node 412-1, and a third configuration setting can be stored that would be the basis for a conversion function to place the generated power measurement into the data format desired by sensor application 430.

As noted, the web API supported by the sensor data control system can be based on HTTP methods such as GET, PUT, POST, and DELETE. In submitting configuration settings to sensor data control system 420, sensor application 430 can use an HTTP PUT method to update a configuration setting that controls a data collection period. For example, the following HTTP PUT method can be used to define a data collection period for sensor module unit S3 attached to node device 412-1 at monitored location 410 as follows:

PUT https://api.senseware.co/Config/Node412_1/S3
{"pollingfreq":"60"}

As this example illustrates, the HTTP PUT method can include a host name "api.senseware.co", an identifier for node device 412-1, and an identifier for sensor module unit S3. This information enables sensor data control system 420 to identify the target of the configuration setting related to the sensor data collection period. In the body of the request, the "pollingfreq" is set to 60 seconds.

In one embodiment, the identifier for sensor module unit S3 can be sufficiently unique in the context of monitored location 410 such that the identifier for node device 412-1 is not needed in the HTTP PUT method. In another embodiment, a particular sensor module unit can be identified by a port identifier, which identifies the particular connector interface of node device 412-1 to which a particular sensor module unit is attached. For example, where node device 412-1 supports four sensor module units S1-S4, then each of the four sensor module units can be uniquely identified by a port identifier having a value in the range of 1-4.

In one embodiment, the sensor data collection period can be applied to every sensor supported by a sensor module unit. In another embodiment, the sensor data collection period can be applied to individual sensors supported by a sensor module unit. For example, a first sensor supported by a sensor module unit can have a first sensor data collection period, while a second sensor supported by the sensor module unit can have a second sensor data collection period. To support sensor-specific data collection periods, a further specification of particular sensors supported by the sensor module unit can be included in the HTTP PUT method. For example, the HTTP PUT method can further include one or more identifiers for individual sensors.

Sensor application 430 can use the web API (e.g., HTTP POST method) to submit configuration settings for a first conversion function that generates a power measurement from a voltage measurement and current measurement, and a second conversion function that places the power measurement into the data format desired by sensor application 430. For example, the following HTTP POST method can be used to define the first conversion function that generates a power measurement from a voltage measurement and current measurement as follows:

POST https://api.senseware.co/Convert/Node412_1/S3
{"convfxn":"PowerFxnA", "V_In":"channel_1", "I_In": "channel_2"}

As this example illustrates, the HTTP POST method can create a new conversion function for sensor module unit S3. In the body of the request, the selected conversion function can represent one of a library of conversion functions, which is identified using an index into the library. Also specified in the body of the request are the two sensor channel identifiers representing the voltage input (V_In) and the current input (I_In).

Sensor application 430 can similarly use the web API to submit configuration settings for the second conversion function. The configuration settings for the two conversion functions and the sensor data collection period are submitted via one or more method calls via the web API and are stored in the database as settings 421.

As illustrated in FIG. 4, the stored configuration settings that specify the new data collection period can be used by sensor data control system 420 in generating a configuration setup request (illustrated as process element "2" in FIG. 4) for delivery to gateway 411 at monitored location 410. In one embodiment, the configuration setup request is an HTTP message delivered in response to a system status update message from node device 412-1 (e.g., HTTP POST method) received by sensor data control system 420 from gateway 411 via the web API. For example, when the system status update is received, sensor data control system 420 can compare the current configuration setting (e.g., default sensor data collection period) to the newly stored custom configuration setting in the database. When the comparison indicates that the current configuration does not match the newly stored custom configuration setting, then sensor data control system 420 can initiate the transmission of a configuration setup request having the newly stored custom configuration setting. In one embodiment, the comparison can be based on a computed hash value of the configuration settings that is included in the system status update.

Figure 10:
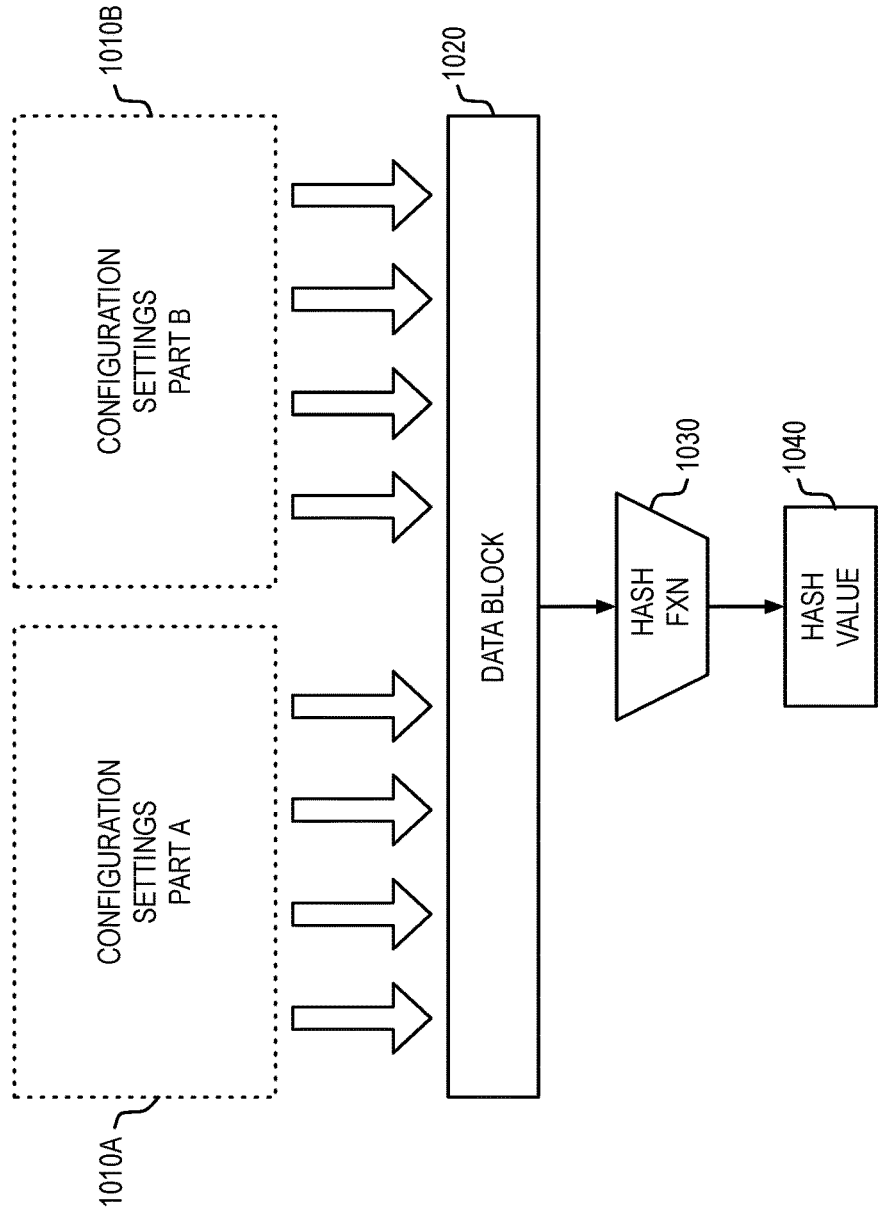
FIG. 10 illustrates an example computation of a hash value using a hash function.

The hash value is computed using a hash function. In general, a hash function can represent any function that can map data of arbitrary size to data of fixed size. FIG. 10 illustrates an example computation of a hash value using a hash function. In one embodiment, the configuration settings data are separated into two parts 1010A and 1010B that form the high-end and low-end parts of data block 1020. The particular type and amount of configuration settings data that would be included in data block 1020 would be implementation dependent. Data block 1020 is provided as input to hash function 1030. Hash function 1030 would then produce hash value 1040.

Figure 11:
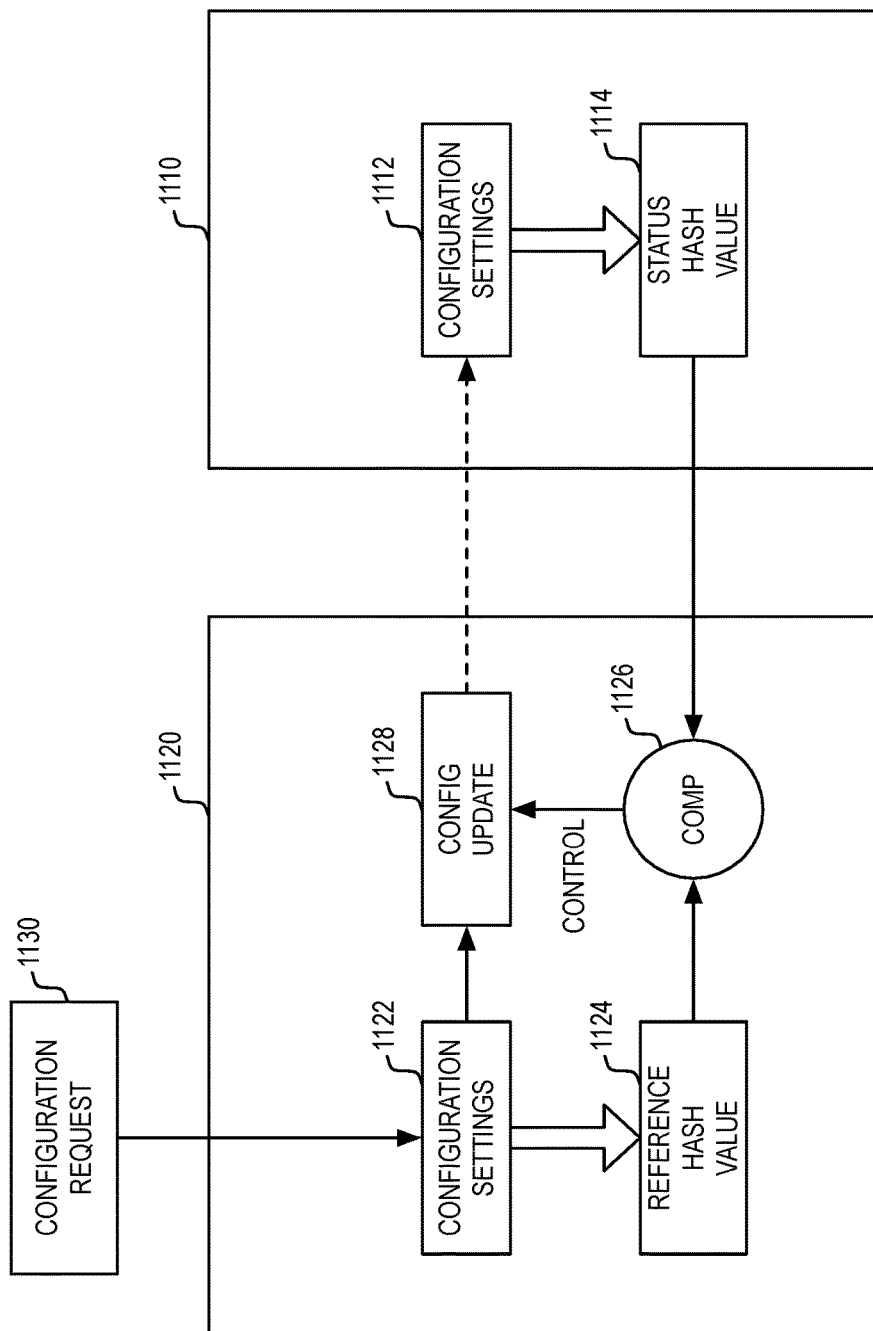
FIG. 11 illustrates a framework of a configuration update.

As noted, the transmission of the configuration setup request to gateway 411 can be conditioned on a comparison of computer hash values generated based on configuration settings. FIG. 11 illustrates a framework of a configuration update. In the illustrated example, sensor data control system 1120 can receive configuration request 1130. In one example, the configuration request can be received from a sensor application. In another example, the configuration request can be generated internally by sensor data control system 1120.

Configuration request 1130 can be used to modify one or more configuration settings 1122 stored by sensor data control system 1120, wherein the modified one or more configuration settings reflect a configuration change desired to be applied at a node at monitored location 1110. Configuration settings 1122 are used by a hash function to generate reference hash value 1124. Reference hash value 1124 can be evaluated using comparison 1126 relative to status hash value 1114, which is received by sensor data control system 1120 as part of a system status update from a node device at monitored location 1110. Configuration settings 1112 currently used by the node are provided as input to the same hash function to generate status hash value 1114 at monitored location 1110.

If comparison 1126 indicates that reference hash value 1124 matches status hash value 1114, then sensor data control system 1120 would know that the configuration settings used to generate reference hash value 1124 and the configuration settings used to generate status hash value 1114 are the same. In other words, configuration settings 1112 currently used by the node at monitored location 1110 matches configuration settings 1122 stored for the node by sensor data control system 1120. An update of configuration settings 1112 for the node at monitored location 1110 would therefore be unneeded.

If, on the other hand, comparison 1126 indicates that reference hash value 1124 is different from status hash value 1114, then sensor data control system 1120 would know that the configuration settings used to generate reference hash value 1124 and the configuration settings used to generate status hash value 1114 are not the same. In other words, configuration settings 1112 currently used by the node at monitored location 1110 do not match configuration settings 1122 stored for the node by sensor data control system 1120. This can be the case, for example, where configuration request 1130 seeks to modify one or more configuration settings 1122 stored by sensor data control system 1120.

When comparison 1126 indicates that reference hash value 1124 is different from status hash value 1114, then a control signal can be generated that would initiate the transmission of configuration update packet 1128 from sensor data control system 1120 to a gateway at monitored location 1110. Configuration update packet 1128 can include configuration information that can be used to update configuration settings 1112 at the relevant node at monitored location 1110. After configuration settings 1112 have been modified using configuration update packet 1128 (i.e., the node configuration has been modified), the modified configuration settings 1112 are used to generate a new status hash value 1114. The newly generated status hash value 1114 can then be returned in a subsequent system status update. When comparison 1126 determines that the newly generated status hash value 1114 matches reference hash value 1124, sensor data control system 1120 would know that the configuration update has been successfully applied by the node at monitored location 1110.

One of the advantages of using hash values to confirm the configuration settings of a node is that it would obviate the need for the node to transmit all of the configuration settings 1112 back to sensor data control system 1120 for comparison. This would be especially problematic where configuration settings 1112 are voluminous. This can be the case, for example, where configuration settings 1112 include information for commands over an interface such as Modbus, BACnet, or any other external interface.

In one embodiment, reference hash value 1124 and status hash value 1114 are each based on configuration settings for both the node device and one or more supported sensor module units. In another embodiment, a first reference hash value is based on configuration settings for a node device, and one or more additional reference hash values are based on configuration settings for one or more respective sensor module units supported by the node device. In this embodiment, multiple comparisons can be performed based on multiple status hash values returned in a system status update.

Returning to FIG. 4, the delivery of configuration setup information by sensor data control system 420 to gateway 411 (illustrated as process element "2") can be conditioned on a configuration settings check by sensor data control system 420 as described above. Where the configuration update relates to an operation of node device 412-1, gateway 411 can deliver a configuration update packet containing the configuration setup information to node device 412-1 via the wireless mesh network. This communication is illustrated as process element "3" in FIG. 4.

Based on the receipt of configuration setup information via the wireless mesh network, node device 412-1 can adjust the data collection period for sensor module unit S3. This configuration change is illustrated as process element "4" in FIG. 4. Based on the change in configuration, node device 412-1 can collect sensor readings from sensor module unit S3 at the newly defined collection period (e.g., 60 seconds). The sensor data values collected at the newly defined collection period can then be delivered by node device 412-1 to gateway 411 in data packets via the wireless mesh network. This communication is illustrated as process element "5" in FIG. 4.

In forwarding the received sensor data value to sensor data control system 420, gateway 411 can prepare an HTTP POST method that submits the latest sensor data value for recording in the database. This communication is illustrated as process element "6" in FIG. 4. The received sensor data value can be stored in a database as sensor data 422.

Based on the first defined conversion function stored in settings 421, sensor data control system 420 can transform sensor data 422 into aggregation data 423. For example, sensor data control system 420 can transform a first sensor data value based on a voltage measurement and a second sensor data value based on a current measurement into an aggregation data value reflective of a power measurement. Based on the second defined conversion function stored in settings 421, sensor data control system 420 can place one or more aggregation data values into a data format desired by sensor application 430. In one example, the second defined conversion function defines a data format for the singular power measurement data values. In another example, the second defined conversion function defines a data format for multiple power measurement values in a report. In the illustration of FIG. 4, the combined conversion process of the first and second defined conversion functions is illustrated as process element "7". The resulting aggregation data 423 has now been prepared for the particular use by sensor application 430.

In one embodiment, sensor application 430 can retrieve sensor data and/or aggregation data 423 using an HTTP GET method via the web API. For example, the following HTTP GET method can be used to retrieve sensor data for the voltage measurement in a defined range of time (e.g., day, week, month, or other defined period of time) as follows:
GET https://api.senseware.co/sensor/Node412-1_ID/ S3_ID/Ch1_ID?from=TMk1&to=TMk2
In response to this request, sensor data control system 420 can return a response as follows:
[{"Ch1_ID","data":[[Time1,205],[Time2,203],[Time3, 202],[Time4,205],[Time5,203],[Time6,20 3],[Time7,203], [Time8,202],[Time9,202],[Time10,203]]}]
Here, all sensor readings between the two points in time specified in the request are returned to sensor application 430. The communication of sensor data 422 and/or aggregation data 423 from sensor data control system 420 to sensor application 430 is illustrated as process element "8" in FIG. 4.

As this example process illustrates, sensor application 430 can configure a sensor network at a monitored location using a web API. In this manner, any sensor application can configure an operation of any sensor network at any monitored location to suit its particular needs. Moreover, any sensor application can configure a customized processing of sensor data collected from any sensor network at any monitored location to suit its particular needs. In essence, sensor application 430 can define and configure the particular sensor service it desires to receive from sensor data control system 420. Significantly, sensor application 430 need not have any connection to the installation of the sensor network at the monitored location. From the perspective of sensor application 430, the sensor network is part of an established infrastructure that is used only when sensor data is needed and in a scope that is defined by sensor application 430.

Figure 12:
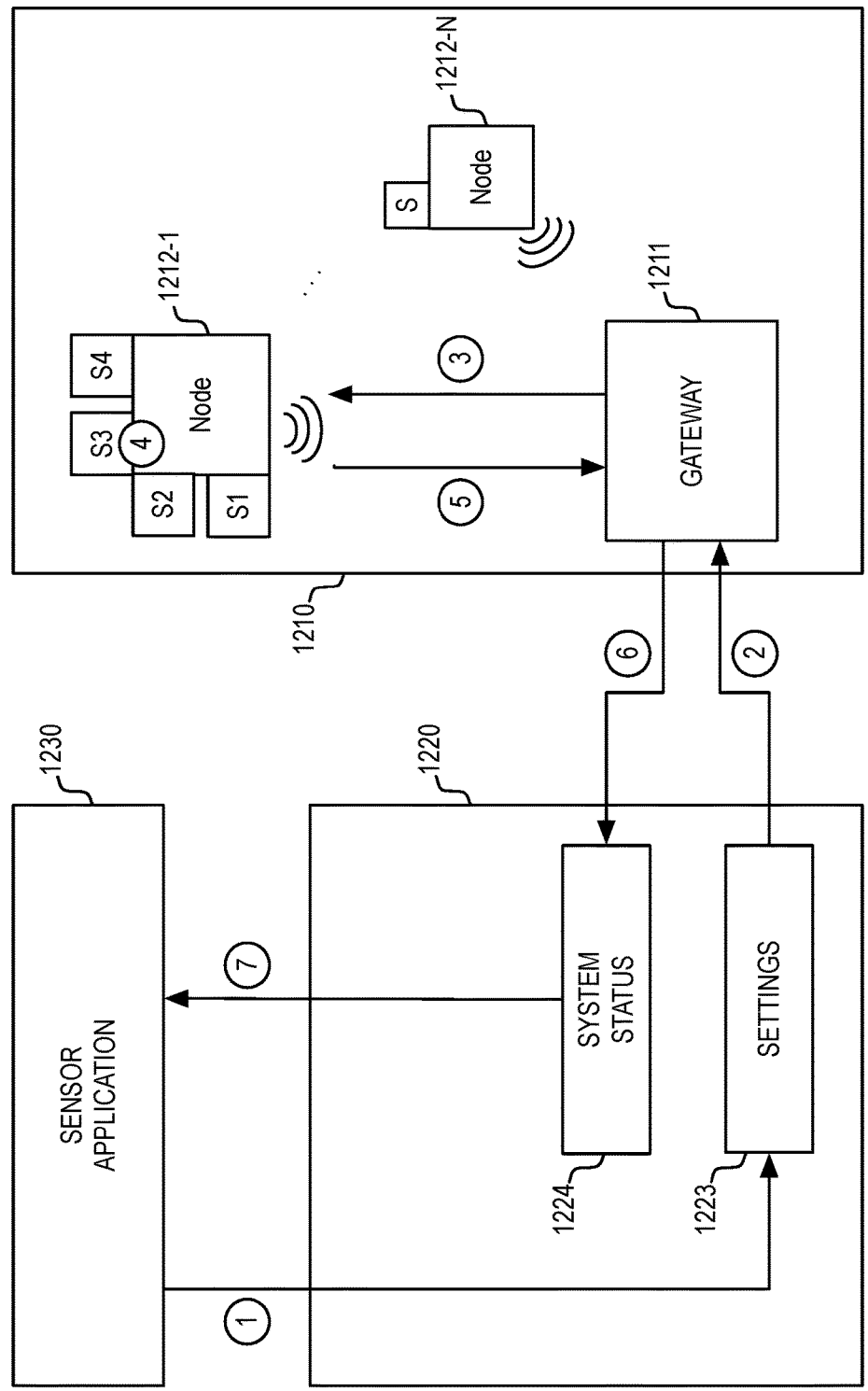
FIG. 12 illustrates a second example operation of a sensor application process.

FIG. 12 illustrates a second example of a sensor application process. In this example, assume that sensor application 1230 requires sensor data for a defined period of time to support an audit activity. As illustrated, the process begins with the communication by sensor application 1230 of configuration settings to sensor data control system 1220. This part of the process is illustrated as process element "1" in FIG. 12. In one embodiment, sensor application 1230 can submit configuration settings to sensor data control system 1220 via web APIs (e.g., HTTP PUT method).

In one example, sensor application 1230 can submit configuration settings that identify one or more sensors for activation from a deactivation state. In one scenario, the one or more sensors may have been deactivated after completion of a previous audit activity that occurred in a previous month, quarter, year, or other time period. The received configuration settings can be stored in a database as settings 1223. The configuration settings that specify the activation of one or more sensors can be used by sensor data control system 1220 in generating a configuration setup request for delivery to gateway 1211 at monitored location 1210. In one embodiment, the configuration setup request is an HTTP message delivered in response to a system status update received by sensor data control system 1220 from gateway 1211 via the web API. In the example embodiment described above, the configuration setup request can be delivered to the gateway when a comparison indicates that a reference hash value computed by the sensor data control system is different from a status hash value computed by the node device at the monitored location.

The delivery of a configuration setup request by sensor data control system 1220 to gateway 1211 is illustrated as process element "2" in FIG. 12. Where the configuration setup request relates to an operation of node device 1212-1 or one or more of supported sensor module units S1-S4, gateway 1211 can deliver a packet containing configuration setup information to node device 1212-1 via the wireless mesh network. This communication is illustrated as process element "3" in FIG. 12.

Based on the receipt of configuration setup information via the wireless mesh network, node device 1212-1 can activate one or more sensors supported by sensor module unit S3. This configuration change is illustrated as process element "4" in FIG. 12. Based on the change in configuration, node device 1212-1 can begin to collect sensor readings for the one or more newly activated sensors. The sensor data values collected for the one or more newly activated sensors can then be delivered to gateway 1211 as data packets via the wireless mesh network for subsequent delivery to sensor data control system 1220.

Additionally, node device 1212-1 can provide gateway 1211 with a status packet that includes information regarding the current configuration of node device 1212-1 and the supported sensor module units S1-S4. In one embodiment, node device 1212-1 includes a status hash value computed by node device 1212-1 using the updated configuration settings. The communication of the information regarding the current configuration is illustrated as process element "5". This information is then provided by gateway 1211 to sensor data control system 1220 as part of a system status update, which is illustrated as process element "6". The information regarding the current configuration of node device 1212-1 and supported sensor module units S1-S4 can then be stored in a database as system status 1224.

The stored system status 1224 would then be available for presentation to sensor application 1230. In one embodiment, sensor application 1230 can retrieve system status 1224 using an HTTP GET method via the web API. The communication of system status 1224 from sensor data control system 1220 to sensor application 1230 in response to the HTTP GET method request is illustrated as process element "7" in FIG. 12. In general, the provision of system status information to sensor application 1230 enables sensor application 1230 to confirm that the sensor network has been configured as specified.

The confirmation of system status in the context of configuration requests can play a key role in the utility of a sensor service. For example, a confirmation of sensor activation would enable sensor application 1230 to determine that needed sensor service functionality in a mission critical application (e.g., auditing) is now online. In another example, a confirmation of sensor deactivation would enable sensor application 1230 to determine that sensor service functionality has been disabled and that billing charges will not continue to accrue.

As noted, the usage of hash values computed based on configuration settings enables the sensor data control system to verify on a continual basis in an efficient manner the configuration settings of node devices and supported sensor module units at the monitored location. The status hash value returned in the system status update enables the sensor data control system to determine whether the current configuration settings of a node device and supported sensor module units match the configuration settings stored at the sensor data control system. If the reference hash value and the returned status hash value do not match, then the sensor data control system would continue to exert its configuration control by re-transmitting a configuration setup request to the gateway at the monitored location for delivery to the node device.

In one scenario, the system status update from the node device can reflect an unauthorized configuration setting change implemented by the node device and/or sensor module unit(s). In this case, the sensor data control system would determine that the status hash value does not match the reference hash value, then send a configuration setup request to the gateway to bring the node device and/or supported sensor module units back to an operating state having the authorized configuration settings stored at the sensor data control system.

In another scenario, the system status update from the node device can reflect a configuration setting change due to the drop-in replacement of a sensor module unit. For example, a defective sensor module unit can be replaced with a new sensor module unit that has not been configured. In this scenario, the status hash value returned by the node device in the next system status update would not match the reference hash value at the sensor data control system. The sensor data control system would then transmit to the gateway for delivery to the node device, a configuration setup request having the currently stored configuration settings used by the previous sensor module unit. The configuration settings for the now replaced sensor module unit can then be applied to the replacement sensor module unit, thereby enabling rapid configuration of the new sensor module unit. For example, the configuration settings can include details for a plurality of Modbus interface commands used by the previous sensor module unit. This rapid configuration would obviate the need for re-specification of the individual Modbus commands used by the previous sensor module unit.

Figure 13:
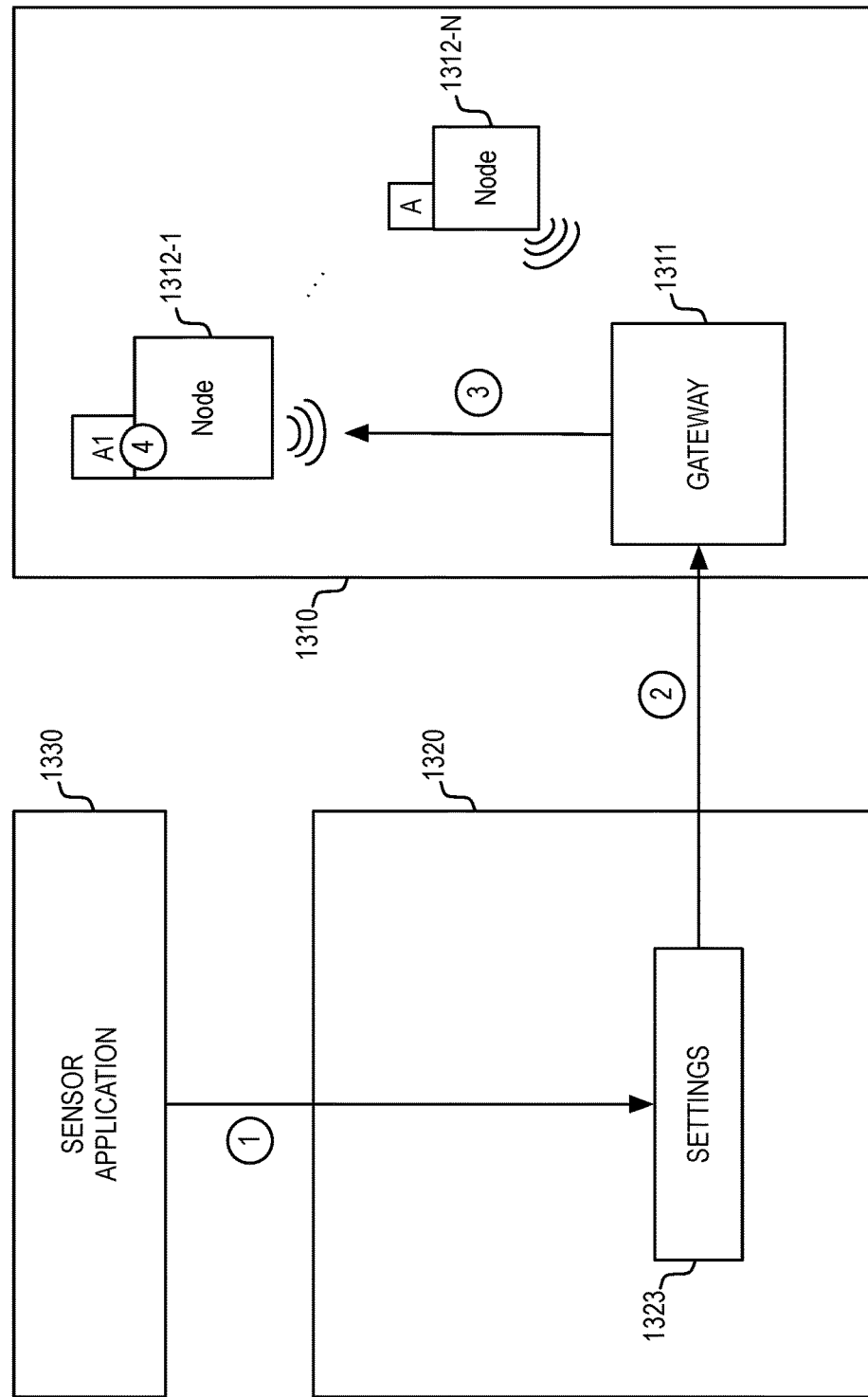
FIG. 13 illustrates a third example operation of a sensor application process.

FIG. 13 illustrates a third example of a sensor application process. In this example, assume that sensor application 1330 receives sensor data and/or aggregation data from sensor data control system 1320 via the web API. This acquisition of sensor data and/or aggregation data can enable sensor application 1330 to perform a demand analysis on the sensor data and/or aggregation data.

In a simple example, the demand analysis can be configured to compare sensor data and/or aggregation data to one or more threshold values (e.g., determine whether temperature reading from sensor X is greater than a threshold temperature value). The result of this demand analysis enables determination of whether a response action should be taken. In a more complex example, the demand analysis can be based on a defined demand estimation function such as fxn(sensor1, sensor2, . . . sensorN). In yet another example, the demand analysis can represent a combinatorial analysis of multiple input values. Here, a conditional analysis of multiple independent demand components (e.g., (sensor1>X1 AND sensor2>X2) OR sensor3<X3)) can be performed as part of the demand analysis. As would be appreciated, a demand analysis based on a plurality of sources of sensor data and/or aggregation data can be defined to infer a particular change in demand at a monitored location.

The demand analysis performed by sensor application 1330 can be configured to produce a response trigger. In one embodiment, this response trigger can be used to effect a response action using one or more control node devices 1312-n installed at monitored location 1310. In one embodiment, control node devices 1312-n can be connected to gateway 1311 through wireless connections. In another embodiment, control node devices 1312-n can be connected to gateway 1311 through wired connections.

Each control node device 1312-n can support one or more actuator module units (A) that incorporate one or more actuators that can be used to effect a response action at monitored location 1310. In one example, control node devices 1312-n can be similar to the example node devices described with reference to FIG. 5. In this framework, control node devices 1312-n can also include a universal interface that enables attachment of one or more actuator module units. In one embodiment, the actuator module units could be integrated with the control node device. In another embodiment, a control node device can represent a node device to which a sensor module unit and/or an actuator module unit is attached.

Actuator module units can be configured to effect various types of response actions at monitored location 1310. As such, the plug-and-play nature of actuator module units would provide significant flexibility in configuring and/or re-configuring the response actions that are desired to be effected at monitored location 1310. The particular types of response actions that can be effected would be implementation dependent. To illustrate a range of the types of response actions that can be effected by actuators supported by the actuator module units, consider the following demand/response system examples.

In one example, the demand/response model can be designed to effect a feedback loop to control resource consumption at monitored location 1310. In this scenario, the collection of sensor data and/or aggregation data can be designed to enable an estimate of demand for a particular resource (e.g., water, electricity or gas consumption) at monitored location 1310. Based on the demand analysis, sensor application 1330 can then generate one or more response messages that are configured to adjust future consumption of the particular resource at monitored location 1310. In a simple example, the one or more response messages can be designed to instruct an actuator to initiate the display of a visual alert to personnel at monitored location 1310 that the consumption of the particular resource is exceeding a threshold. Here, the visual alert can be provided by the actuator itself, or by another device coupled to the actuator. In another example, the one or more response messages can be designed to instruct an actuator to transmit a control signal to a device to alter consumption of the particular resource. In one scenario, the actuator control signal can shut down or otherwise limit the operation (e.g., reduce light output) of a device that consumes the particular resource. In yet another example, the one or more response messages can be designed to instruct an actuator to transmit a control signal to a device that governs the supply of the particular resource to monitored location 1310. In one scenario, the control signal can lower the maximum rate at which the particular resource can be supplied to monitored location 1310.

In another example, the demand/response model can be designed to maintain a desired status at monitored location 1310. In this scenario, the sensor data and/or aggregation data can be designed to enable determination of the current state of a measureable quantity at monitored location 1310. In one example, the measurable quantity can represent a temperature of a room or area, a supply level of a resource, a fullness of a storage or inventory area, an efficiency of operation of one or more components, a level of activity or traffic, or any other quantity having a level or target that is desired. In this scenario, the sensor data and/or aggregation data can be used to determine the current state of the measurable quantity. If the demand analysis indicates that the current state of the measurable quantity has hit a level of variance relative to a target level, wherein the level of variance is beyond a threshold variance, then sensor application 1330 can generate one or more response messages that can instruct one or more actuators at monitored location 1310 to transmit a control signal that is operative to reduce the variance in the measurable quantity.

For example, there may exist an area at monitored location 1310 that desires the temperature and/or humidity to be maintained at a certain level (e.g., refrigerated area, server room, surgical room, or other temperature and/or humidity sensitive environment). When the analysis of sensor data and/or aggregation data indicate that the current temperature and/or humidity has deviated too much from a target level, then one or more response messages can be produced to instruct an actuator to generate a control signal to adjust the operation of an HVAC system that governs the particular area of monitored location 1310 or adjust a level of operation of one or more components that impacts the temperature and/or humidity at that particular area of monitored location 1310. For example, a control signal can be used to modify the operation of a heat-generating component.

In another example, sensor data and/or aggregation data can be used to detect sub-optimal operation of one or more components at monitored location 1310. In one scenario, temperature sensor readings can be used to measure how well a current chiller (e.g., machine that cools air, a substance or equipment) is working and to generate a control signal that can be used to signal the need for repair or for a new chiller to be obtained. For example, the control signal can be used to provide contact information for a repair technician or sales representative. In another scenario, sensor data and/or aggregation data that are indicative of power consumption relative to efficiency of operation can be used to signal the need for repair or for a new unit to be obtained. In effect, the analysis of sensor data and/or aggregation data can be used to produce sales opportunities at monitored location 1310.

More generally, sensor data and/or aggregation data can be used to detect malfunctions in equipment where a deviation from an expected level of operation is detected through analysis. For example, a sump pump sensor can be used to detect when a sump pump is not working, or working inefficiently. One or more response messages can then be produced to instruct an actuator to generate a control signal to alert relevant personnel at monitored location 1310. In another example, sensor data and/or aggregation data can be used to detect water leaks (e.g., water sensor) and for generating one or more response messages that can be used by an actuator to generate a control signal to alert relevant personnel at monitored location 1310 in a timely manner.

In another example, the demand/response model can be designed to discover and release unused resources at monitored location 1310. In this scenario, sensor data and/or aggregation data can be designed to effect a determination of the current usage of resources at monitored location 1310. In this context, the resources can represent temporary or shared offices, conference rooms, common areas, storage facilities, or other physical resources at monitored location 1310 that can be re-purposed or otherwise leveraged in a new capacity. In one example, sensor data and/or aggregation data can be used to determine the current usage of a defined physical space by individuals, inanimate objects, or other items that have usage characteristics. If the demand analysis indicates that the defined physical space is unused or used at a level below a threshold amount, then sensor application 1330 can generate one or more response messages that can instruct actuators at monitored location 1310 to transmit a control signal that is used to signal the availability of at least part of the defined physical space. One application of such a demand/response model is to enable workplace reservation optimization such that reserved resources (e.g., conference rooms) are released when sensor data and/or aggregation data (e.g., light, sound, $CO^2$, or other sensor reading) indicate that the reserved resource is not being used. When sensor data and/or aggregation data indicate that the reserved resource is not being used, then one or more response messages can be used (e.g., message to a resource manager, receptionist, or other party responsible for overseeing use of the reserved resource) to release the reservation or otherwise indicate the current availability of a previously-reserved resource.

In a related application, the demand/response model can be used to determine and signal when resources can be used. For example, sensor data and/or aggregation data can be used to detect harmful conditions that preclude the occurrence of organized activities. For example, wet bulb globe temperature (WBGT) sensor readings, which represent a composite temperature used to estimate the effect of temperature, humidity, wind speed (wind chill), and visible and infrared radiation (usually sunlight) on humans, can be used to detect whether organized outdoor activities should be held in a school, a military base, or other organization hosting an outdoor event. In a simple example, sensor application 1330 can generate one or more response messages that can instruct actuators at monitored location 1310 to transmit a first control signal that is used to indicate that an organized activity can be held (e.g., green light), a second control signal that is used to indicate than an organized activity cannot be held (e.g., red light), or another control signal that is used to indicate one or more restrictions for an organized activity (e.g., warning lights and instructions).

As has been described, the demand/response model can represent a scenario where the demand analysis performed on sensor data and/or aggregation data is used to initiate one or more response actions by one or more actuators at monitored location 1310. The exact form of the response action and the control signal mechanism used by the actuator that effects the response action can vary based on the sensor application. As noted with reference to FIG. 3, sensor applications directed to different segments of the marketplace can desire different types of control actions.

In the present disclosure, it is recognized that the response messages produced by sensor application 1330 based on a demand/response model can represent a request for a configuration change of an actuator module unit at monitored location 1310. In submitting configuration settings to sensor data control system 1320, sensor application 1330 can use an HTTP PUT method to update a configuration setting that controls an operation of an actuator supported by an actuator module unit. This part of the process is illustrated as process element "1" in FIG. 13. The submitted configuration settings can be stored in a database as settings 1323, and can be used as the basis for adjusting the configuration of an actuator module unit at monitored location 1310.

As illustrated in FIG. 13, the stored configuration setting 1323 that specifies the operation of an actuator module unit can be used by sensor data control system 1320 in generating one or more response messages for delivery to gateway 1311 at monitored location 1310. The delivery of one or more response messages by sensor data control system 1320 to gateway 1311 is illustrated as process element "2" in FIG. 13. Where the response message relates to an operation of actuator module unit A1 supported by node device 1312-1, gateway 1311 can deliver a packet containing actuator control information to node device 1312-1 via the wireless mesh network. This communication is illustrated as process element "3" in FIG. 13. Based on the receipt of actuator control information via the wireless mesh network, node device 1312-1 can deliver the actuator control information to actuator module unit A1 to effect a control action desired by sensor application 1330. This control action is illustrated as process element "4" in FIG. 13.

Figure 14:
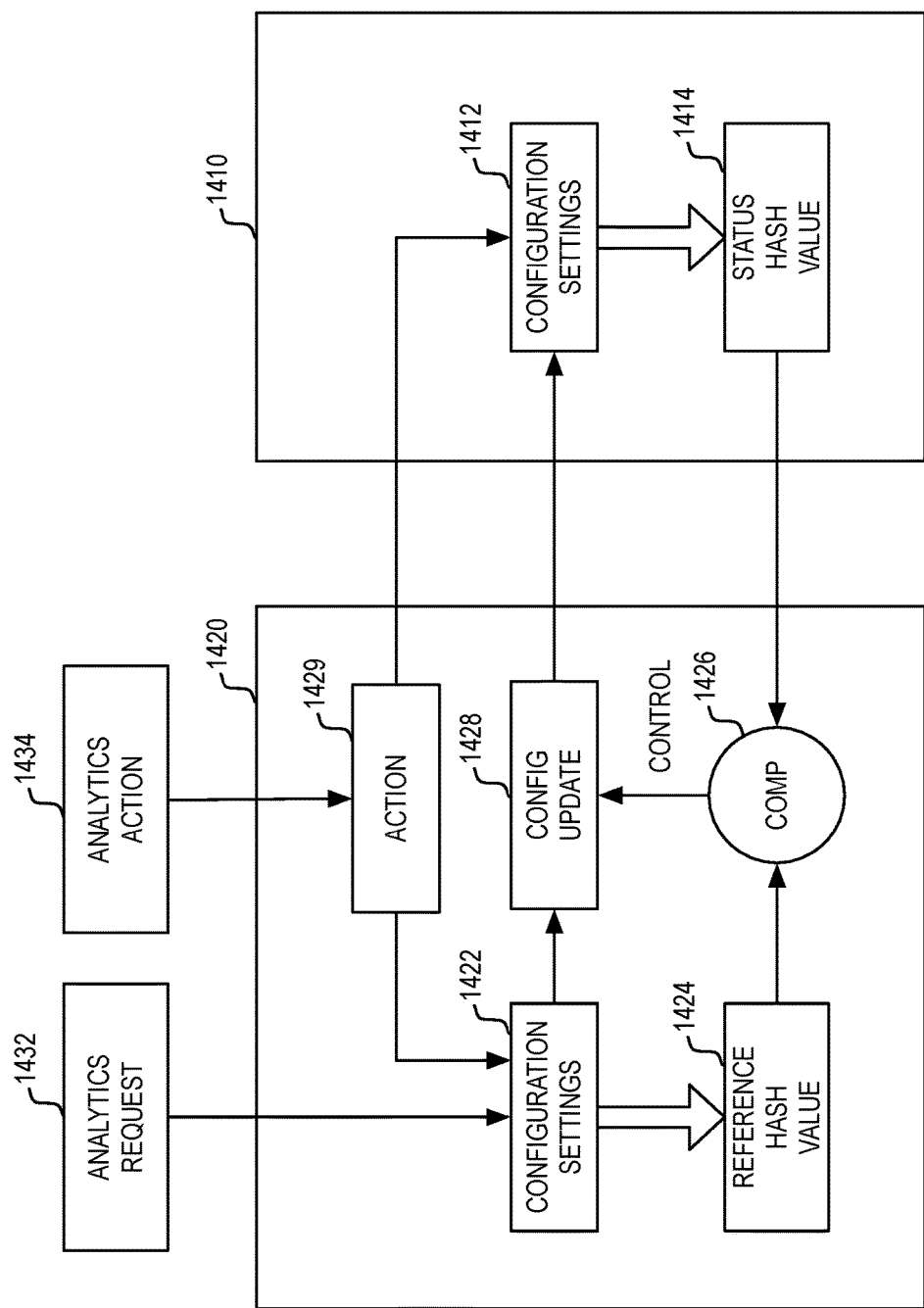
FIG. 14 illustrates a framework for delivering control actions.

FIG. 14 illustrates a framework for delivering control actions. In general, a control action can produce a change in state in the node device and/or supported actuator module units, wherein the change in state can be considered a controllable configuration setting. As described with reference to FIG. 11, an update to configuration settings at the monitored location can be initiated using a configuration setup request, wherein a configuration update packet can be transmitted based on a comparison of a status hash value to a reference hash value.

In one example, a control action can be treated in a manner similar to a configuration request. Consider for example a control action that is initiated using analytics request 1432. In a manner similar to the process described in FIG. 11, sensor data control system 1420 can receive analytics request 1432 from a sensor application. Alternatively, the analytics request can be generated internally by sensor data control system 1420.

Analytics request 1432 can be used to establish or modify one or more configuration settings 1422 stored by sensor data control system 1420 that are associated with a desired control action. Configuration settings 1422 are used by a hash function to generate reference hash value 1424. Reference hash value 1424 can be evaluated using comparison 1426 relative to status hash value 1414, which is received by sensor data control system 1420 as part of a system status update from a node device at monitored location 1410. Configuration settings 1412 currently stored by the node device are used by the same hash function to generate status hash value 1414 at monitored location 1410.

When comparison 1426 indicates that reference hash value 1424 is different from status hash value 1414, then a control signal can be generated that would initiate the transmission of a configuration update packet 1428 from sensor data control system 1420 to a gateway at monitored location 1410. Configuration update packet 1428 can include control action information that can be used to implement the desired control action at monitored location 1410. The implementation of the desired control action would be reflected by updated configuration settings 1412 at the relevant node device at monitored location 1410. After configuration settings 1412 have been updated, then the newly generated status hash value 1414 that is returned in a subsequent system status update would match reference hash value 1424, thereby indicating to sensor data control system 1420 that the control action has been successfully implemented at monitored location 1410.

As has been described, a control action can be implemented in response to a system status update received from monitored location 1410. This framework can be used where the control action is not time-sensitive.

Where the control action is time-sensitive, the control action can be implemented based on analytics action 1434. In general, analytics action 1434 can be used to produce immediate action by sensor data control system 1420. As illustrated, analytics action 1434 would produce action packet 1429, which can be immediately transmitted to the gateway at monitored location 1410 for delivery to the relevant node device. Unlike configuration update packet 1428, the transmission of action packet 1429 is not dependent on comparison 1426.

At sensor data control system 1420, the control action represented by action packet 1429 would be used to update configuration settings 1422. The updated configuration settings 1422 would then be used to generate a new reference hash value 1424 that can be used in a comparison with the status hash value 1414 to be returned in the next system status update. If the control action contained in action packet 1429 is successfully implemented at monitored location 1410, then configuration settings 1412 would be modified to reflect the implementation of the control action. The status hash value 1414 produced from the modified configuration settings 1412 would then be returned to sensor data control system 1420 in a system status update for comparison to reference hash value 1424. The successful implementation of the control action at monitored location 1410 would cause status hash value 1414 to match reference hash value 1424. No further attempts at implementing the control action would therefore be needed through the sending of a subsequent configuration update packet 1428 that includes the control action.

If, on the other hand, the control action in action packet 1429 is not implemented at monitored location 1410 (e.g., due to transmission error), then configuration settings 1412 would not be modified and status hash value 1414 would remain the same. The return of the unchanged status hash value 1414 in a system status update would not match the new reference hash value 1424 generated using configurations settings 1422 that have been updated to reflect the desired analytics action 1434. This failed comparison would trigger the transmission of configuration update packet 1428, which would include new configuration settings reflective of the desired analytics action 1434. In other words, the transmission of configuration update packet 1428 would represent another attempt to implement analytics action 1434 at monitored location 1410 due to its apparent failed implementation as reflected by the system status update.

It should be noted that control actions need not be initiated by messaging generated by elements (e.g., sensor applications) external to sensor data control system 1420. In one embodiment, sensor data control system 1420 itself can generate requests or actions using internal analytics.

The example configuration settings framework provided in FIGS. 11 and 14 illustrates a process for centralized enforcement of configuration settings. In the present disclosure it is recognized that configuration settings can also be modified at the initiative of local elements at the monitored location. For example, a control action (e.g., thermostat change) can be initiated under the direction of equipment or personnel at the monitored location without the knowledge of the sensor data control system.

Figure 15:
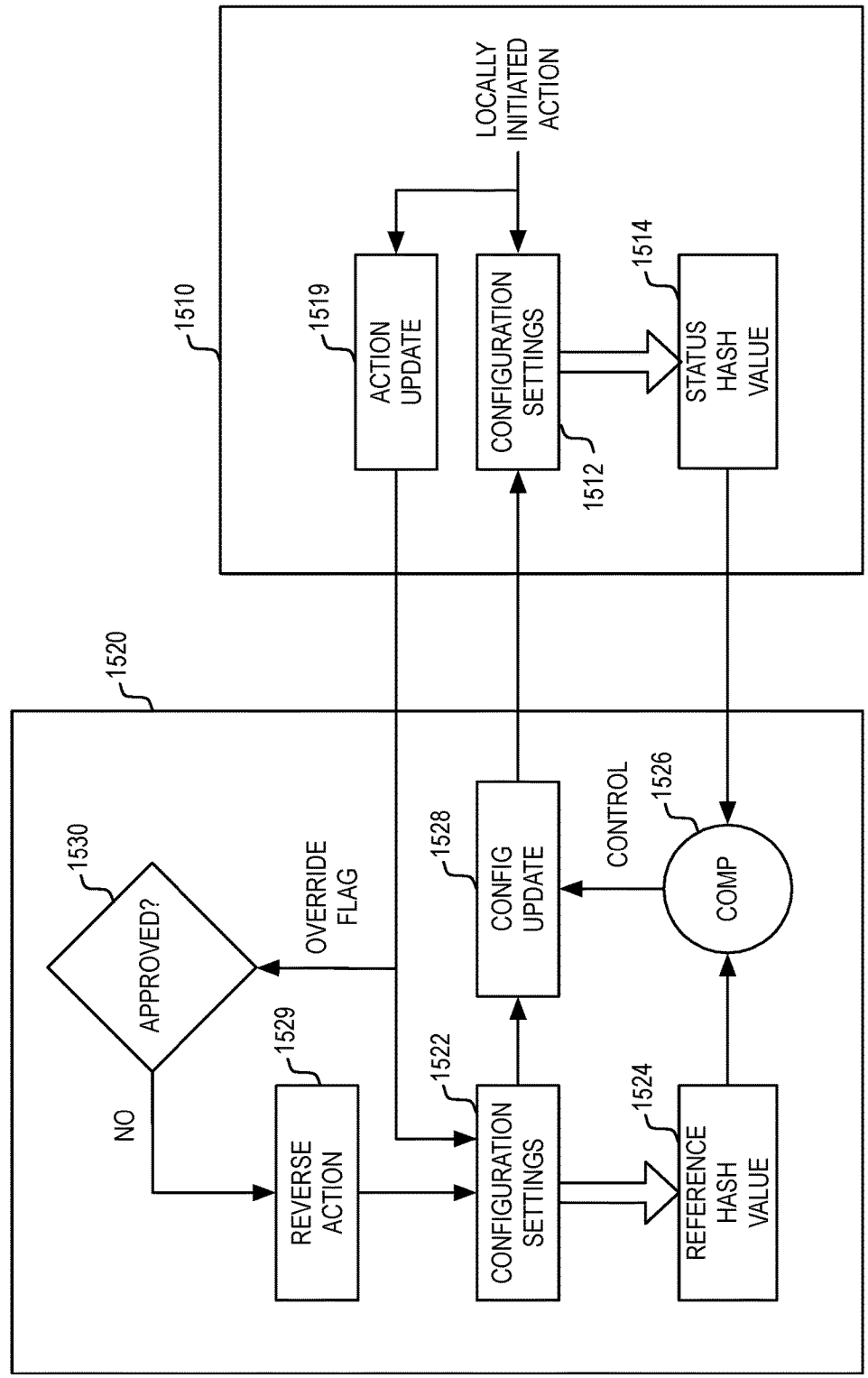
FIG. 15 illustrates a framework for handling local actions.

FIG. 15 illustrates a framework for handling locally-initiated control actions. A locally-initiated control action can be generated through manual and/or automated initiatives that are outside of the control of sensor data control system 1520. The locally-initiated control action can produce a change in configuration settings 1512, which change may not be known by sensor data control system 1520. To alert sensor data control system 1520 of the locally-initiated control action, action update transmission 1519 is generated for delivery to sensor data control system 1520.

The contents of action update transmission 1519 can be used by sensor data control system 1522 to change configuration settings 1522. This change in configuration settings 1522 would correspond to the change in configuration settings 1512 such that reference hash value 1524 would match status hash value 1514, thereby preventing an immediate reversal of the locally-initiated control action at monitored location 1510.

As illustrated, the receipt of action update transmission 1519 can also be designed to produce an override flag message that seeks approval of the locally-initiated control action. Since the sensor data control system 1520 did not initiate the locally-initiated control action, sensor data control system 1520 can be configured to initiate approval process 1530 to assure that the locally-initiated control action is allowed to persist. As would be appreciated, the particular approval process 1530 used would be implementation dependant. In one example, approval process 1530 can involve external approval by a customer through a sensor application. In another example, approval process 1530 can involve a pre-defined set of rules that can be used to validate the locally-initiated control action.

If approval process 1530 approves the locally-initiated control action, then the validation of the locally-initiated control action can be recorded and the locally-initiated control action can remain in force. This would result because reference hash value 1524 would match status hash value 1514.

If, on the other hand, approval process 1530 does not approve the locally-initiated control action, then reverse action message 1529 can be generated. In one embodiment, reverse action message 1529 can be applied as a change to configuration settings 1522 such that the locally-initiated control action is reversed or otherwise neutralized. This change in configuration settings 1522 would produce a change in reference hash value 1524 such that comparison 1526 would detect a mismatch between the new reference hash value 1524 and status hash value 1514 returned in the system status update. Recall that status hash value 1514 reflects the locally-initiated control action. This detected mismatch by comparison 1526 would yield a control signal that initiates a transmission of configuration update packet 1528 to the gateway at monitored location 1510 that seeks to reverse or otherwise neutralize the locally-initiated control action. In one embodiment, a configuration update packet can be sent immediately instead of waiting for a system status update packet from the monitored location. This immediate transmission of a configuration update packet would be similar to the use of action packet 1429 as illustrated in FIG. 14.

In one embodiment, reference hash values 1424, 1524 and status hash values 1414, 1514 are each based on configuration settings for both the node device and one or more supported actuator module units. In another embodiment, a first reference hash value is based on configuration settings for a node device, and one or more additional reference hash values are based on configuration settings for one or more respective actuator module units supported by the node device. In this embodiment, multiple comparisons can be performed based on multiple status hash values returned in a system status update.

It should be noted that the control action framework based on configuration settings need not be used for every control action implemented at the monitored location. Some control actions, for example, may not be reflected in the configuration settings. This can be the case, for example, where the control action represents a non-critical function, a function that need not be monitored, a function designated primarily for local control, or any other function having a scope of control outside of the context of the sensor data control system.

As has been described, the sensors as a service model promotes the open usage of sensors and the data collected by them to any party having an interest in at least part of a monitored location. Discrete sensor applications can be developed to leverage the sensor service for particular industry or application segments.

Another embodiment of the present disclosure can provide a machine and/or computer readable storage and/or medium, having stored thereon, a machine code and/or a computer program having at least one code section executable by a machine and/or a computer, thereby causing the machine and/or computer to perform the steps as described herein.

Those of skill in the relevant art would appreciate that the various illustrative blocks, modules, elements, components, and methods described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Those of skill in the relevant art can implement the described functionality in varying ways for each particular application. Various components and blocks may be arranged differently (e.g., arranged in a different order, or partitioned in a different way) all without departing from the scope of the subject technology.

These and other aspects of the present disclosure will become apparent to those skilled in the relevant art by a review of the preceding detailed disclosure. Although a number of salient features of the present disclosure have been described above, the principles in the present disclosure are capable of other embodiments and of being practiced and carried out in various ways that would be apparent to one of skill in the relevant art after reading the present disclosure, therefore the above disclosure should not be considered to be exclusive of these other embodiments. Also, it is to be understood that the phraseology and terminology employed herein are for the purposes of description and should not be regarded as limiting.

What is claimed is:

1. A method, comprising:
   receiving, by a sensor data control system, a request to change a configuration of a wireless node in a wireless sensor network at a monitored location, the wireless node supporting one or more sensors at the monitored location;
   transmitting, by the sensor data control system, a configuration message for delivery to the wireless node, the configuration message including configuration information that enables the wireless node to change at least one configuration setting used by the wireless node in controlling a delivery of sensor data from the one or more sensors to the sensor data control system;

generating, by the sensor data control system, a first configuration hash value using a hash function having an input based on the at least one configuration setting identified by the request;

receiving, by the sensor data control system from a gateway device at the monitored location, a status message associated with the wireless node at the monitored location, the status message including a second configuration hash value generated by the wireless node using the hash function and having an input based on current configuration settings of the wireless node;

comparing, by the sensor data control system, the first configuration hash value to the second configuration hash value; and when the comparison indicates that the first configuration hash value is different from the second configuration hash value, retransmitting, by the sensor data control system to the gateway device, the configuration message based on the request to effect a change in the current configuration settings of the wireless node.

2. The method of claim 1, wherein the request activates one or more sensors supported by the wireless node from a deactivated state.

3. The method of claim 1, wherein the request changes a measurement resolution of one or more sensors supported by the wireless node.

4. The method of claim 1, wherein the request changes a polling frequency by the wireless node.

5. The method of claim 1, wherein the request changes a sampling frequency by one or more sensors supported by the wireless node.

6. The method of claim 1, wherein the request changes a device address or register address for a Modbus interface command generated by the wireless node.

7. The method of claim 1, wherein the request changes a state in an actuator device.

8. A method, comprising:
transmitting, by a sensor data control system, a configuration message for delivery to a wireless node at a monitored location, the configuration message including configuration information that enables the wireless node to change at least one configuration setting used by the wireless node in controlling a delivery of sensor data from one or more sensors to the sensor data control system;

receiving, by the sensor data control system from a gateway device at the monitored location, a status message associated with the wireless node at the monitored location, the status message including a first configuration hash value generated by the wireless node using a hash function and having an input based on current configuration settings of the wireless node;

comparing, by the sensor data control system, the first configuration hash value to a second configuration hash value, wherein the second configuration hash value is produced by the sensor data control system using the hash function and having an input based on a stored set of configuration settings for the wireless node; and when the comparison indicates that the first configuration hash value is different from the second configuration hash value, retransmitting, by the sensor data control system to the gateway device, the configuration message based on the stored set of configuration settings to effect a change in the current configuration settings of the wireless node.

9. The method of claim 8, wherein the change in the current configuration settings is an activation of one or more sensors from a deactivated state.

10. The method of claim 8, wherein the change in the current configuration settings is a change in measurement resolution of one or more sensors.

11. The method of claim 8, wherein the change in the current configuration settings is a change in polling frequency by the wireless node.

12. The method of claim 8, wherein the change in the current configuration settings is a change in sampling frequency by one or more sensors.

13. The method of claim 8, wherein the change in the current configuration settings is an identification of a device address or register address for a Modbus interface command.

14. The method of claim 8, wherein the change in the current configuration settings is a change in state of an actuator device.

15. A non-transitory computer-readable medium having a configuration update tool stored thereon for use by one or more server devices, the configuration tool including:
a transmission section that when executed, causes the configuration update tool to transmit a configuration message for delivery to a wireless node at a monitored location, the configuration message including configuration information that enables the wireless node to change at least one configuration setting used by the wireless node in controlling a delivery of sensor data from one or more sensors to a sensor data control system;

a comparison section that when executed, causes the configuration update tool to compare a first configuration hash value to a second configuration hash value, the first configuration hash value generated by the wireless node at the monitored location using a hash function and having an input based on current configuration settings of the wireless node, the second configuration hash value retrieved from a memory storage device using an identifier associated with the wireless node, wherein the second configuration hash value is produced by the configuration update tool using the hash function and having input values based on a stored set of configuration settings for the wireless node; and an update section that when executed, causes the configuration update tool to initiate a configuration update retransmission to the gateway device when the comparison indicates that the first configuration hash value is different from the second configuration hash value, wherein the configuration update retransmission includes the configuration message based on the stored set of configuration settings to effect a change in the current configuration settings of the wireless node.

16. The non-transitory computer-readable medium of claim 15, wherein the change in the current configuration settings is an activation of one or more sensors from a deactivated state.

17. The non-transitory computer-readable medium of claim 15, wherein the change in the current configuration settings is a change in measurement resolution of one or more sensors.

18. The non-transitory computer-readable medium of claim 15, wherein the change in the current configuration settings is a change in polling frequency by the wireless node.

19. The non-transitory computer-readable medium of claim 15, wherein the change in the current configuration settings is a change in sampling frequency by one or more sensors.

20. The non-transitory computer-readable medium of claim 15, wherein the change in the current configuration settings is an identification of a device address or register address for a Modbus interface command.

* * * * *